US012772001B1

(12) United States Patent
Satongar et al.

(10) Patent No.: US 12,772,001 B1
(45) Date of Patent: Oct. 20, 2026

(54) SYSTEM AND METHOD FOR MANAGING MULTI-DEVICE CONNECTIONS WITH A HEADSET USING SPATIAL AUDIO

(71) Applicant: Apple Inc., Cupertino, CA (US)

(72) Inventors: Darius A. Satongar, Staffordshire (GB); James H. Foster, Oxford (GB); Per Haakan Linus Persson, San Francisco, CA (US); Sean B. Kelly, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 421 days.

(21) Appl. No.: 18/470,307

(22) Filed: Sep. 19, 2023

Related U.S. Application Data

(60) Provisional application No. 63/376,692, filed on Sep. 22, 2022.

(51) Int. Cl.
*H04R 5/04* (2006.01)
*H04R 5/033* (2006.01)

(52) U.S. Cl.
CPC ............... *H04R 5/04* (2013.01); *H04R 5/033* (2013.01); *H04R 2420/07* (2013.01); *H04R 2430/01* (2013.01); *H04R 2460/07* (2013.01)

(58) Field of Classification Search
CPC ...... H04R 5/04; H04R 5/033; H04R 2420/07; H04R 2430/01; H04R 2460/07
See application file for complete search history.

(56) References Cited

U.S. PATENT DOCUMENTS

| | | | |
|---|---|---|---|
| 7,668,964 | B2 | 2/2010 | Millington |
| 7,983,614 | B2 | 7/2011 | Dunko |
| 8,239,559 | B2 | 8/2012 | Rajapakse |
| 8,311,967 | B1 | 11/2012 | Lin et al. |
| 8,559,931 | B2 | 10/2013 | Moon et al. |
| 9,529,500 | B1 | 12/2016 | Gauci et al. |
| 9,912,373 | B1 | 3/2018 | Wang |
| 10,194,259 | B1 | 1/2019 | Martin et al. |

(Continued)

FOREIGN PATENT DOCUMENTS

| | | | |
|---|---|---|---|
| CN | 104717363 | A | 6/2015 |
| CN | 105528438 | A | 4/2016 |

(Continued)

OTHER PUBLICATIONS

"FM Translators Get Their Own RDS Codes," National Radio Systems Committee, Nov. 29, 2017, 2 pages.

(Continued)

*Primary Examiner* — Daniel R Sellers
(74) *Attorney, Agent, or Firm* — Aikin & Gallant, LLP

(57) ABSTRACT

A headset that includes several speaker drivers, a processor, and memory having stored therein instructions which when executed by the processor causes the headset to receive, from an electronic device and via a first wireless communication link, an audio signal, determine a location of the electronic device with respect to the headset within an environment in which the headset is located, produce a set of spatially rendered audio signals by spatially rendering the audio signal based on the location, and use the set of spatially rendered audio signals to drive the speaker drivers to produce a virtual sound source for the audio signal at the location.

20 Claims, 8 Drawing Sheets

(56) References Cited

U.S. PATENT DOCUMENTS

| | | | | |
|---|---|---|---|---|
| 10,331,399 | B2 | 6/2019 | Alsina et al. | |
| 11,146,909 | B1 | 10/2021 | Pinto et al. | |
| 11,190,899 | B2 | 11/2021 | Stringer et al. | |
| 11,805,381 | B2 | 10/2023 | Pinto et al. | |
| 11,900,012 | B2 | 2/2024 | Eubank et al. | |
| 12,267,666 | B1 | 4/2025 | Pinto et al. | |
| 12,282,705 | B2 | 4/2025 | Eubank et al. | |
| 12,294,851 | B2 | 5/2025 | Eubank et al. | |
| 2002/0126855 | A1 | 9/2002 | Terada | |
| 2007/0061735 | A1 | 3/2007 | Hoffberg et al. | |
| 2008/0167923 | A1 | 7/2008 | Chowdhary et al. | |
| 2010/0011405 | A1 | 1/2010 | Wu | |
| 2010/0306705 | A1 | 12/2010 | Nilsson | |
| 2010/0318576 | A1 | 12/2010 | Kim | |
| 2011/0035693 | A1 | 2/2011 | Ueno et al. | |
| 2011/0055758 | A1 | 3/2011 | Lukasiak et al. | |
| 2011/0119628 | A1 | 5/2011 | Carter et al. | |
| 2012/0115453 | A1 | 5/2012 | Zheng | |
| 2012/0202424 | A1 | 8/2012 | Kim | |
| 2012/0259439 | A1 | 10/2012 | Li | |
| 2013/0041648 | A1* | 2/2013 | Osman | H04S 7/302 381/300 |
| 2013/0094683 | A1* | 4/2013 | Hansen | H04R 5/04 381/309 |
| 2013/0230086 | A1 | 9/2013 | Sorensen | |
| 2013/0251169 | A1 | 9/2013 | Awano | |
| 2013/0290347 | A1 | 10/2013 | Saib | |
| 2014/0007171 | A1 | 1/2014 | Yang et al. | |
| 2014/0032678 | A1 | 1/2014 | Koukoumidis et al. | |
| 2014/0101472 | A1 | 4/2014 | Rohrweck | |
| 2014/0123022 | A1 | 5/2014 | Lee et al. | |
| 2014/0161270 | A1 | 6/2014 | Peters et al. | |
| 2014/0274185 | A1 | 9/2014 | Luna et al. | |
| 2014/0354441 | A1 | 12/2014 | Luna | |
| 2015/0082242 | A1 | 3/2015 | Antipa | |
| 2015/0088422 | A1 | 3/2015 | Nikovski et al. | |
| 2015/0088662 | A1 | 3/2015 | Noller et al. | |
| 2016/0357509 | A1 | 12/2016 | Alsina et al. | |
| 2016/0357774 | A1 | 12/2016 | Gauci et al. | |
| 2016/0373909 | A1 | 12/2016 | Rasmussen et al. | |
| 2017/0068423 | A1 | 3/2017 | Napolitano et al. | |
| 2017/0076208 | A1 | 3/2017 | Huang et al. | |
| 2017/0293507 | A1 | 10/2017 | Liu et al. | |
| 2018/0020298 | A1* | 1/2018 | Courtois | H04R 25/552 |
| 2018/0181364 | A1 | 6/2018 | Gupta et al. | |
| 2018/0183881 | A1 | 6/2018 | Lewis et al. | |
| 2018/0249250 | A1 | 8/2018 | Pate et al. | |
| 2018/0262849 | A1* | 9/2018 | Farmani | H04R 25/407 |
| 2019/0317721 | A1 | 10/2019 | Sheen et al. | |
| 2020/0097248 | A1 | 3/2020 | Wood et al. | |
| 2020/0204280 | A1 | 6/2020 | Thagadur Shivappa et al. | |
| 2020/0225817 | A1 | 7/2020 | Coffman et al. | |
| 2020/0252726 | A1 | 8/2020 | Kitamura et al. | |
| 2021/0014613 | A1 | 1/2021 | Carrigan et al. | |
| 2021/0297518 | A1 | 9/2021 | Keum | |
| 2023/0113703 | A1* | 4/2023 | Eubank | H04R 29/001 381/303 |

FOREIGN PATENT DOCUMENTS

| | | | |
|---|---|---|---|
| CN | 109450580 | A | 3/2019 |
| CN | 109495845 | A | 3/2019 |
| CN | 110311745 | A | 10/2019 |
| CN | 111694538 | A | 9/2020 |
| CN | 112882622 | A | 6/2021 |
| CN | 112969096 | | 6/2021 |
| EP | 2477104 | | 7/2012 |
| EP | 2618247 | | 7/2013 |
| EP | 2786889 | | 10/2014 |
| JP | 2004-152276 | | 5/2004 |
| JP | 2010-130669 | | 6/2010 |
| JP | 6601030 | B2 | 11/2019 |
| KR | 100617576 | B1 | 9/2006 |
| KR | 2012-0082371 | | 7/2012 |
| KR | 2015-0001871 | | 1/2015 |
| WO | 2009072196 | | 6/2009 |

OTHER PUBLICATIONS

"Resume playing on different device," The Spotify Community, Mar. 4, 2012, 8 pages.

Zibreg, Christian, "PlayOff enables Apple Music continuity playback between your Mac and iPhone," Mar. 5, 2019, 10 pages.

Yan, Tingxin, et al., "Fast App Launching for Mobile Devices Using Predictive User Context," MobiSys '12, Jun. 25-29, 2021, ACM 978-1-4503-13-1, Aug. 12, 2006, 14 pages.

Brandao, G., "Headphone Connect," Google Play App, Sep. 5, 2014, 4 pages.

"When Using a Tasker, get on a car How to start music from Android terminal automatically," MacWin, Ver. 0.7, Jan. 29, 2011, 6 pages.

Baladad, Mike, "How to Auto Start Your Favorite Music Player When Plugging Headphones into a Galaxy S4," Nov. 28, 2013, 16 pages.

Hoffman, Chris, "How to Use Tasker to Automate Your Android Phone," Aug. 21, 2013, 10 pages.

Baladad, Mike, "How to Auto-Start Your Favorite Music Player When Plugging Headphones into a Galaxy S4," Dec. 31, 2014, 14 pages.

Parziale, Carl, "Bluetooth Connect and Play-Android Apps on Google Play," Mar. 14, 2015, 5 pages.

"Auto play music on bluetooth?" Jun. 7, 2021, 6 pages.

Maobipes, "Comment posted on article How to stop the music app from auto-playing in your car," May 8, 2015, 1 page.

Leif Johnson, "How to hand off music or phone calls from your iPhone to a HomePod", received from https://www.macworld.com/article/233474/how-to-hand-off-music-or-phone-calls-from-your-iphone-to-a-homepod.html, Oct. 31, 2019, 6 pages.

Marc DeAngelis, "Spotify tests simplified speaker handoff feature", received from https://www.engadget.com/2019-08-13-spotify-tests-simplified-speaker-handoff-feature.html, Aug. 13, 2019, 1 page.

* cited by examiner

SYSTEM AND METHOD FOR MANAGING MULTI-DEVICE CONNECTIONS WITH A HEADSET USING SPATIAL AUDIO

RELATED APPLICATIONS

This application claims the benefit of priority of U.S. Provisional Application No. 63/376,692 filed Sep. 22, 2022, which is herein incorporated by reference.

FIELD

An aspect of the disclosure relates to a system that manages multi-device connections with a headset using spatial audio. Other aspects are also described.

BACKGROUND

Spatial audio can be rendered using headphones that are worn by a listener. In particular, headphones may reproduce a spatial audio signal to simulate a soundscape around the listener. An effective spatial sound reproduction can render sounds such that the user perceives the sound as coming from a location within the soundscape external to the listener's head, just as the listener would experience the sound if encountered in the real world.

When a sound travels to a listener from a surrounding environment in the real world, the sound propagates along a direct path, e.g., through air to the listener's ear canal entrance, and along one or more indirect paths, e.g., by reflecting and diffracting around the listener's head and shoulders (e.g., to the listener's other ear canal entrance). As the sound travels along the indirect paths, artifacts can be introduced into the acoustic signal that the ear canal entrance receives. User-specific artifacts can be incorporated into binaural audio by signal processing algorithms that use spatial audio filters. For example, a head-related transfer function (HRTF) is a filter that contains all of the acoustic information required to describe how sound reflects or diffracts around a listener's head, torso, and outer ear before entering their auditory system.

To listen to spatial audio, an HRTF may be selected from a dataset of angle-dependent HRTFs to be applied to an audio input signal to shape the signal in such a way that reproductions of the shaped signal realistically simulates a sound traveling to the user from the relative angle associated with the selected HRTF. Accordingly, a listener can use simple stereo headphones to create the illusion of a sound source somewhere in a listening environment by applying the HRTF to the audio input signal.

SUMMARY

An aspect of the disclosure is a headset that includes several speaker drivers (e.g., a left speaker driver and a right speaker driver), a processor, and memory having stored therein instructions which when executed by the processor causes the headset to receive, from an electronic device and via a first wireless communication link, an audio signal; obtain a location of the electronic device with respect to the headset within an environment in which the headset is located; produce a set of spatially rendered audio signals by spatially rendering the audio signal based on the locations; and use the set of spatially rendered audio signals to drive the plurality of speaker drivers to produce a virtual sound source for the audio signal at the location.

In one aspect, prior to receiving the audio signal, the electronic device uses the audio signal to drive a speaker driver to play back sound, and as the set of spatially rendered audio signals are used to drive the speaker drivers, the electronic device ceases to use the audio signal to drive the speaker driver. In another aspect, the memory has further instructions to sense head tracking data that indicates a position and/or an orientation of the headset, wherein the set of spatially rendered audio signals are produced according to the position and/or the orientation of the headset such that the virtual sound source is maintained at the location regardless of the position and/or the orientation of the headset. In some aspects, the memory has further instructions to determine that the headset is moving either towards the electronics device or moving away from the electronic device based on the head tracking data; responsive to determining that the headset is moving towards the electronic device, increase a volume level of the headset; and responsive to determining that the user is moving away from the electronic device, reduce the volume level of the headset. For instance, the volume level may be adjusted by applying one or more gains to the audio signal. For example, the volume level may be increased by applying one gain to the audio signal, and the level may be reduced by applying another gain.

In one aspect, the memory has further instructions to determine that the headset has moved outside a physically audible range of the electronic device; and responsive to determining that the headset has moved outside the physically audible range, cease to use the set of spatially rendered audio signals to drive the plurality of speaker drivers. In some aspects, the electronic device begins playing back the audio signal through one or more speaker drivers responsive to the headset moving outside the physically audible range. In another aspect, the memory has further instructions to determine whether the electronic device is within a physically audible range of the headset and, responsive to determining that the electronic device is within the physically audible range, establish the wireless communication link with the electronic device and begin to receive the audio signal.

In one aspect, the electronic device is a first electronic device, the location is a first location, the audio signal is a first audio signal, the virtual sound source is a first virtual sound source, the memory has further instructions to receive, from a second electronic device and via a second wireless communication link, a second audio signal; and obtain a second location of the second electronic device with respect to the headset, the set of spatially rendered audio signals are produced by spatially rendering the first and second audio signals based on the first and second locations, respectively, such that the first virtual sound source is produced at the first location and a second virtual sound source for the second audio signal is produced at the second location. In some aspects, the first audio signal is received contemporaneously with the second audio signal. In another aspect, the memory has further instructions to determine that the first virtual sound source is of interest to the user, produce an ambient sound signal using the second audio signal; produce a mix that includes the first audio signal and the ambient sound signal, and use the mix in lieu of the set of spatially rendered audio signals to drive the plurality of speaker drivers to produce the first audio signal as direct sound and to produce the ambient sound signal as ambient sound. In another aspect, the instructions to produce the ambient sound signal comprises instructions to apply reverberation to the second audio signal. In one aspect, the instructions to determine that the first virtual sound source is of interest to the user comprises instructions to receive a control signal from an audio playback device that indicates a user selection of the first virtual sound source. In another aspect, the set of spatially rendered audio signals is a first set of spatially rendered audio signals, where the memory has further instructions to: receive an indication that the first virtual sound source is to be muted, produce a second set of spatially rendered audio signals by spatially rendering the second audio signal; and use the second set of spatially rendered audio signals to drive the speaker drivers to only produce the second virtual sound source.

In one aspect, the memory has further instructions to: determine that the electronic device is to play back the audio signal; transmit a control signal to the electronic device to cause the electronic device to play back the audio signal; and cease using the set of spatially rendered audio signals to drive the plurality of speaker drivers. In some aspects, the virtual sound source is a first virtual sound source and the audio signal is a first audio signal, the memory has further instructions to identify using sensor data of one or more sensors of the headset, an object within the environment; assigning a second virtual sound source at the location of the object within the environment, wherein the second virtual sound source comprises a second audio signal; and spatially rendering the first and second audio signals into the set of spatially rendered audio signals such that when used to drive the plurality of speaker drivers the headset produces the first virtual sound source at the location of the electronic device and produces the second virtual sound source at the location of the object.

According to another aspect of the disclosure, a method performed by a programmed processor of an audio playback device, the method comprising: receiving, from an electronic device and via a first wireless communication link, an audio signal; determining a location of the electronic device with respect to the audio playback device; producing set of spatially rendered audio signals by spatially rendering the audio signal according to the location; and transmitting, via a second wireless communication link with a headset, the set of spatially rendered audio signals to the headset that is being worn by a user of the audio playback device.

In one aspect, the electronic device is a first electronic device, the location is a first location, and the audio signal is a first audio signal, the method further comprises receiving, from a second electronic device and via a third wireless communication link, a second audio signal contemporaneously with the first audio signal; and determining a second location of the second electronic device with respect to the audio playback device, the set of spatially rendered audio signals are produced by spatially rendering the first and second audio signals based on the first and second locations, respectively. In some aspects, the first and second audio signals are spatially rendered such that the headset produces a first virtual sound source at the first location that produces the first audio signal and a second virtual sound source at the second location that produces the second audio signal when the set of spatially rendered audio signals are used to drive one or more speakers of the headset. In some aspects, the method further comprises displaying, on a display, a graphical user interface (GUI) that includes a first (e.g., user interface (UI)) volume control for controlling a volume level of the first audio signal and includes a second (UI) volume control for controlling a volume level of the second audio signal, wherein, responsive to receiving user input to one of the first and second volume controls, applying a gain to a respective one of the first and second audio signals based on the user input. In one aspect, the audio playback device is a portable electronic device. In another aspect, the audio playback device is a wearable device that is arranged to be worn by the user.

According to another aspect of the disclosure, a method performed by a programmed processor of an electronic device, the method comprising: wirelessly receiving a first audio signal from a first electronic device; wirelessly receiving a second audio signal from a second electronic device, wherein both the first and second audio signals are contemporaneously wirelessly received; spatially rendering the first and second audio signals to produce a set of binaural audio signals; and using the binaural audio signals to drive a plurality of speaker drivers of the headset to produce a first virtual sound source for the first audio signal at a location of the first electronic device and a second virtual sound source for the second audio signal at a location of the second electronic device.

In one aspect, the set of binaural audio signals is a first set of binaural audio signals, where the method further comprises: receiving an indication that the first virtual sound source is to be muted; producing a second set of binaural audio signals by spatially rendering the second audio signal according to the location of the second electronic device; and using the second set of binaural audio signals instead of the first set of binaural audio signals to drive the speaker drivers to only produce the second virtual sound source. In another aspect, the method further includes determining that the second electronic device is to play back the second audio signal; transmitting a control signal to the second electronic device to cause the second electronic device to play back the second audio signal; and spatially rendering the first audio signal instead of the first and second audio signals. In another aspect, determining that the second electronic device is to play back the second audio signal includes determining, using sensor data of a sensor of the electronic device, that the electronic device is moving or has moved away from the second electronic device beyond a threshold distance. In one aspect, the electronic device is a wireless headset.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Figure 1:
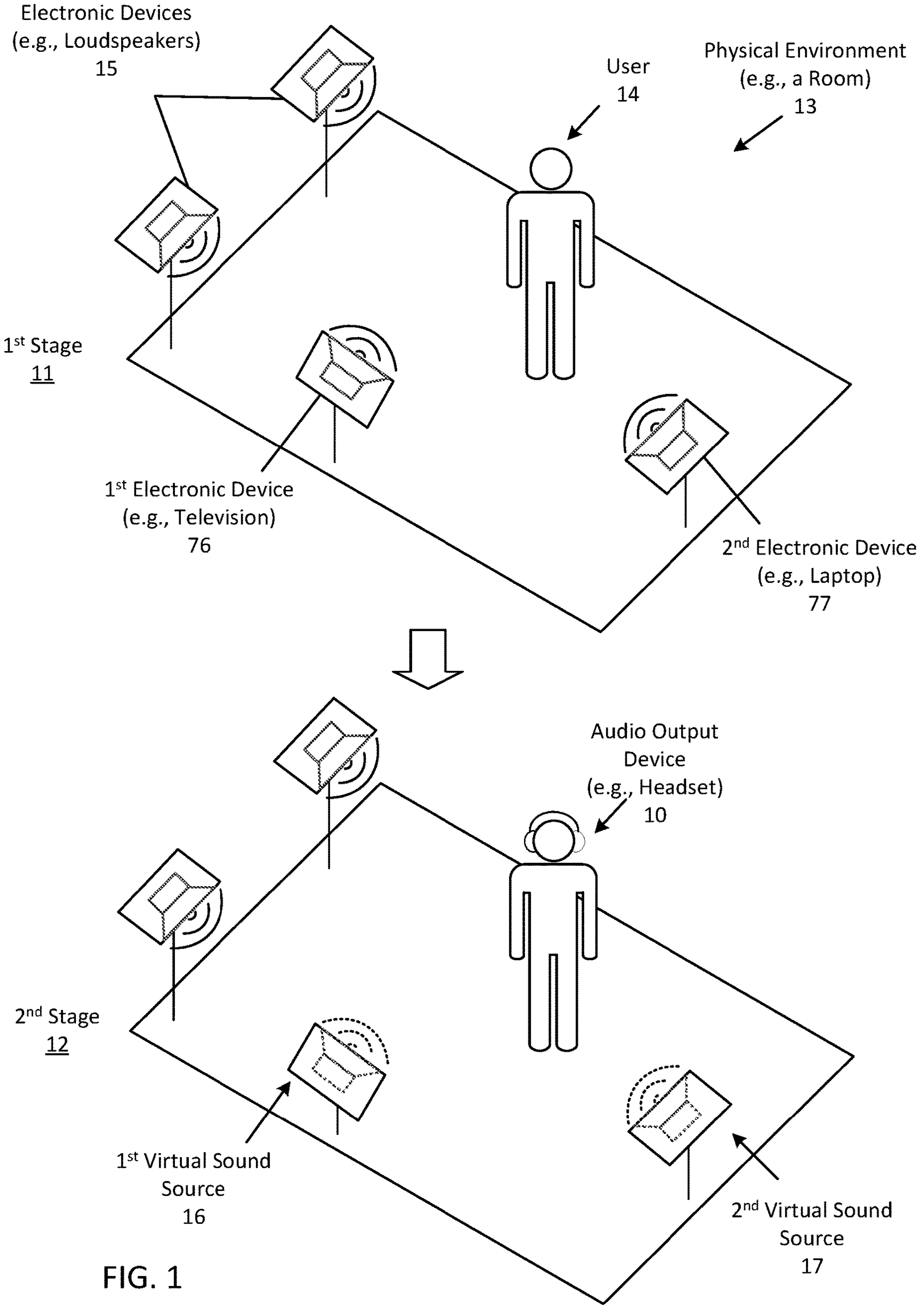
FIG. 1 shows several stages in which a headset that is worn by a user is using spatial audio to produce virtual sound sources at locations of electronic devices within an environment according to one aspect.

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Today, users may have many audio "source" devices, such as a smartphone, a desktop computer, and a digital media player, which are each capable of establishing a wireless connection with a user's wireless headphones. Conventionally, wireless headphones may connect (or pair) to one audio source device at a time, where both devices establish a wireless point-to-point connection through which the single audio source device and the wireless headphones exchange audio data. For example, the wireless headphones may be configured to establish a bi-directional wireless audio connection (e.g., BLUETOOTH Hands-Free Profile (HFP) connection) with an audio source device (e.g., to conduct a hands-free phone call), or may be configured to establish a uni-directional wireless audio connection (e.g., BLUETOOTH Advanced Audio Distribution Profile (A2DP) connection) with the audio source device (e.g., to receive audio data from the source device for playback by the wireless headphones). In some cases, a user may wish to switch between audio source devices. For example, while at home, a user may wish to pair wireless headphones with the desktop computer, but sometime thereafter may wish to pair to the user's smartphone. Switching between audio source devices, however, may be slow and tedious. For instance, most conventional wireless headphones require a user to manually (e.g., by physically pressing a button) pair the headphones with a new source device. Therefore, there is a need for an audio system that manages multi-device connections with headphones using spatial audio.

To overcome these deficiencies, the present disclosure describes a method and a system for managing multi-device wireless connections with headphones using spatial audio. Specifically, the present disclosure includes a headset with several speaker drivers, a processor, and memory having stored therein instructions which when executed by the processor causes the headset to receive, from one or more electronic devices (e.g., audio source devices) and via wireless communication links, audio signals. For example, each electronic device may transmit one or more audio signals of an audio program that is being played back by the electronic device. For instance, one device may transmit audio data associated with one audio program (e.g., a musical composition), while another electronic device transmits audio data associated with a different audio program (e.g., a sound track of a motion picture). In one aspect, the audio signals of each electronic device may be received once the headset comes into a threshold distance of the electronic device (e.g., a physically audible range from which a user may hear sound within a physical environment produced by a speaker driver of the electronic device, such as the user entering a room in which the audio source devices are located). The headset may obtain a location of each electronic device (with which the headset is within the physically audible range, for example,) with respect to the headset within an environment in which the headset is located, and may produce a set of spatially rendered audio signals by spatially rendering the audio signals based on the locations of the one or more electronic devices. Using the set of spatially rendered audio signals, the headset may drive its speaker drivers to produce virtual sound sources for the audio signals at the locations of the one or more electronic devices. As a result, the user may perceive the produced spatial audio as if the electronic devices were emitting sound into the user's environment using their own (e.g., in-device) speakers. In this way, rather than having to pair the headset manually to a specific source device as performed conventionally, the system automatically (e.g., without user intervention) allows the user to hear sound of each of the electronic devices (e.g., contemporaneously) through virtual sound sources produced by the headset as if the devices were emitting sound into the physical environment using their own speaker drivers (e.g., once the user comes within range of the devices), which may provide a more immersive and intuitive audio experience for the user.

FIG. 1 shows two stages 11 and 12 in which an audio output device (e.g., headset) 10 that is worn by a user 14 is using spatial audio to produce virtual sound sources at locations of electronic devices within an environment 13 in order to manage wireless connections with the electronic devices according to one aspect. Specifically, both stages, a first stage 11 and a second stage 12, show several electronic devices 15, 76, and 77 and a user 14 within the physical environment (e.g., a room) 13. In particular, the figure is showing two electronic devices (e.g., loudspeakers) 15, a first electronic device (e.g., a television) 76 and a second electronic device (e.g., a laptop) 77 that are playing back sound into the physical environment 13. Each of the devices may include one or more speaker drivers (e.g., which may be "in-device" speaker drivers that are a part of or housed within a housing of each of the respective devices) and/or may be communicatively coupled to the electronic device. In one aspect, each of the electronic devices may be streaming audio content (e.g., via the Internet from a remote server of a media content service provider and/or from local (or a remote) memory) for playback. In some aspects, some devices may be streaming the same audio content. For example, the two loudspeakers 15 may be streaming an audio program in a stereo format, where one of the loudspeakers is playing back a left audio channel of the audio program and the other loudspeaker is playing back a right audio channel of the audio program. In another aspect, at least one of the devices may be playing back different audio. For example, the television may be playing back a motion picture, where video content of the motion picture is being displayed on a display of the television, and audio content of the motion picture is being played back through one or more of the television's speaker drivers.

Turning to the first stage 11, this stage shows that the user 14 who is not wearing an audio output device, such as a headset, entering the room, and perceiving the sound being produced by the electronic devices within the room that are emitting sounds. The user perceives the sound within the environment "naturally", where sound waves pass through the environment and into the user's ears. In another aspect, the user may be perceiving the sound with the help of an audio device, such as hearing aids or an electronic device that is configured to perform a transparency function. More about the transparency function is described herein. In addition, the user is perceiving the sound naturally, such that as the user moves about the environment, the loudness of the produced sound changes. In particular, the sounds being produced may become louder or quieter as the user moves closer or further away, respectively, from the electronic devices. As described thus far, the sounds within the physical environment are being produced by at least one in-device speaker driver of each electronic device. In another aspect, the environment may include naturally occurring sounds, meaning sounds that are produced without the use of speaker drivers (e.g., a bird chirping, a sound of a bus engine as the bus is driving by, etc.).

In the second stage 12, the user 14 is now wearing an audio output device 10 (e.g., a headset), which is producing spatial audio to produce virtual sound sources at (or near) each of the first and second electronic devices 76 and 77. In particular, the audio output device 10 is spatializing the sound that was being produced by the first and second electronic devices 76 and 77 in the first stage 11. The audio output device 10 is producing a first virtual sound source 16 at a location of the first electronic device 76 and producing a second virtual sound source 17 at a location of the second electronic device 77. Specifically, the audio output device is spatially rendering audio signals from the devices by applying one or more spatial filters (based on the user's location with respect to the locations of the devices) to produce spatially rendered audio signals, which when used to drive speaker drivers of the output device, causes the device 10 to produce the virtual sound sources. In one aspect, the headset 10 may be producing the virtual sound sources using audio data from each respective electronic device. For example, the headset 10 may establish wireless communication links (e.g., BLUETOOTH connections) with both devices 76 and 77, receive audio data from each device, and use the device's respective audio data to produce the device's virtual sound source. Thus, returning to the previous example, the first virtual sound source 16 may be sound of the motion picture that is being played back by the television 76.

As shown, the headset 10 is not producing virtual sound sources for the loudspeakers 15. In one aspect, this may be due to the loudspeakers not being capable of wireless communication with the headset. For instance, the loudspeakers may be hardwired to a receiver device (not shown) that is driving the loudspeakers. In another aspect, the headset may produce the virtual sound sources using any audio data, which may be retrieved from the devices and/or from memory of the headset (or from another device), as opposed to being retrieved from the electronic devices.

In one aspect, as a result of the audio output device 10 spatializing the sound of the first and second electronic devices 76 and 77, the devices may cease playing back their respective audio content into the environment 13. In particular, (e.g., prior to transmitting the audio content to the audio output device 10,) the sound playback of the first and second devices may transition from their in-device speaker drivers to the spatial audio being produced by the audio output device 10. As a result, another person (e.g., who is not wearing an audio output device) within the physical environment may not perceive sound playback by the first and second electronic devices (but may still perceive the playback by the loudspeakers 15), as the audio output device 10 that is being worn by the user 14 spatializes the audio content of the first and second electronic devices. In another aspect, one or more audio output devices may be configured to spatialize the audio content, such that multiple users may hear spatial audio of one or more of the same virtual sound sources.

The spatial audio may provide the user a sense that the sounds of the virtual sound sources are naturally occurring (or similar to natural sound sources) as they were in the first stage 11. In one aspect, the audio output device 10 may be configured to adjust the sound output of the virtual sound sources based on the user's position within the environment 13. For instance, the audio output device 10 may include one or more head-tracking devices (or head trackers) that produces head-tracking data that indicates a position and/or an orientation of the user (e.g., user's head). With the head-tracking data, the audio output device 10 may manage the wireless connections with the devices by adjusting the spatial audio based on changes to the user's position and/or orientation. These adjustments may be similar to changes to a person's perception of naturally occurring sounds, as described herein. For instance, as the user moves towards the first electronic device 76, the audio output device 10 may increase the volume (e.g., sound output) of the first virtual sound source 16. On the other hand, as the user moves away from the first electronic device 76, the volume may be reduced. Thus, the locations of the virtual sound sources may remain in place (e.g., locked into their locations), and changes to the sources may be based on the position of the user. More about adjusting the virtual sound sources is described herein. As a result, the audio output device 10 may manage wireless connections between the electronic devices 76 and 77 with the audio output device 10 using the spatial audio by (e.g., automatically) providing audio playback of audio content from (or associated with) electronic devices, and adjusting playback based on the user's location in space. More about managing the device connections is described herein.

Figure 2:
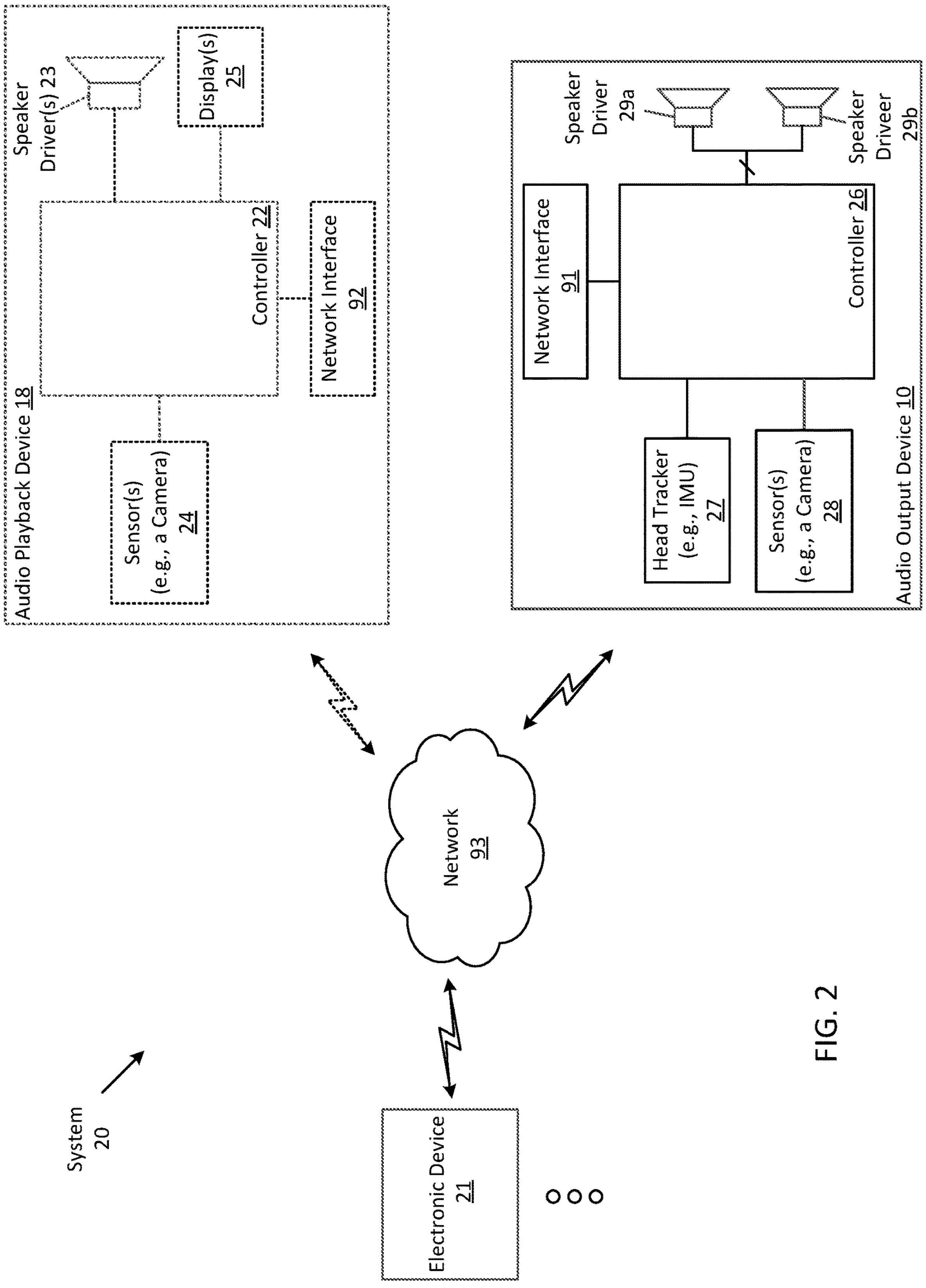
FIG. 2 shows a block diagram of a system that includes an audio output device that is configured to establish wireless communication links with multiple electronic devices and configured to manage those device connections using spatial audio according to one aspect.

FIG. 2 shows a block diagram of a system 20 that includes an audio output device that is configured to establish wirelessly communication links with one or more electronic devices and configured to manage those device connections using spatial audio according to one aspect. Specifically, this figure is showing the system 20 that includes the audio output device 10, an electronic device 21, an (optional) audio playback device 18, and a (e.g., computer) network 93. In one aspect, the system 20 may include more or fewer devices. For example, the system 20 may include one or more electronic devices 21 and/or may not include the audio playback device 18.

In one aspect, the electronic device 21 may be any type of device that (e.g., includes a programmed processor that) may be configured to establish a wireless communication link (or connection), via the network 93 (e.g., a BLUETOOTH connection) with the audio output device 10 and/or the audio playback device 18, and/or may be configured to exchange audio data as one or more audio packets (e.g., in Internet Protocol (IP) packets). In one aspect, the electronic device 21 may include one or more in-device speaker drivers (e.g., speaker drivers that are a part of a housing of the device, as described herein), and may be configured to drive the speaker driver(s) with one or more audio signals (audio data). For example, the electronic device 21 may be similar (or the same) as the first or second electronic devices 76 and 77 of FIG. 1. As described herein, the system 20 may include multiple electronic devices. In this case, the electronic devices of the system 20 may be different or the same with respect to each other. Examples of electronic devices may include a television, a desktop computer, a laptop computer, a smart speaker, a smart phone, a portable gaming device, and a stand-alone loudspeaker. Other examples may also include "smart home" (or "Internet of Things" (IoT)) devices and appliances, such as a refrigerator, a dishwasher, a stove, an oven, a washer, a dryer, a thermostat, a lighting fixture, a home security system, a camera, a microwave, and other home appliances.

In one aspect, the electronic device 21 may be owned by or belonging to the user 14. In some aspects, the electronic device may be registered to the user, through a user account of an on-line service provider with which the audio output may also be registered. In another aspect, the electronic device may not be owned by the user. In some aspects, the electronic device may be an audio system having multiple electronic components, such as a public address (PA) system (e.g., a PA system of a train station, a bus station, an airport, etc.) that includes one or more speakers. In another aspect, the electronic device may be an audio system that may or may not include a speaker, however, may be configured to transmit audio data to a (e.g., wireless) device. For example, the electronic device may be an assistive listening system, such as a hearing loop.

In one aspect, the audio output device 10 may be any electronic device that includes at least one speaker and is configured to produce output sound by driving the speaker. For instance, as illustrated in FIG. 1, the device may be a wireless headset (e.g., in-ear headphones or earbuds) that are designed to be positioned on (or in) a user's ears, and are designed to output sound into the user's ear canal. In some aspects, the earphone may be a sealing type that has a flexible ear tip that serves to acoustically seal off the entrance of the user's ear canal from an ambient environment by blocking or occluding in the ear canal. In one aspect, the output device includes a left earphone for the user's left ear and a right earphone for the user's right ear. In this case, each earphone may be configured to output at least one audio channel of media content (e.g., the right earphone outputting a right audio channel and the left earphone outputting a left audio channel of a two-channel input of a stereophonic recording, such as a musical work). In another aspect, the output device may be any electronic device that includes at least one speaker and is arranged to be worn by the user and arranged to output sound by driving the speaker with an audio signal. As another example, the output device may be any type of headset, such as an over-the-ear (or on-the-ear) headset that at least partially covers the user's ears and is arranged to direct sound into the ears of the user.

In some aspects, the audio output device 10 may be a head-worn device. In another aspect, the audio output device 10 may be any electronic device that is arranged to output sound into an ambient environment. Examples may include a stand-alone speaker, a smart speaker, a home theater system, or an infotainment system that is integrated within a vehicle.

The audio output device 10 includes one or more electronic components (or elements). In particular, the audio output device 10 has a controller 26, a network interface 91, a head tracker (e.g., an inertial measurement unit (IMU)) 27, and one or more sensors 28, and two speaker drivers **29*a* and 29*b*** (or speakers). In one aspect, the audio output device may include more or fewer elements, such as having one or more speaker drivers, and/or having one or more displays (e.g., which may be configured to display image data).

Each of the speaker drivers **29*a* and 29*b* may be an electrodynamic driver that may be specifically designed for sound output at certain frequency bands, such as a woofer, tweeter, or midrange driver, for example. In one aspect, the either (or both of) the speaker drivers may be a "full-range" (or "full-band") electrodynamic driver that reproduces as much of an audible frequency range as possible. In one example, the speaker driver 29*a* may be a right speaker driver that is arranged to produce (direct) sound towards (or into) a user's right ear when the audio output device 10 is worn on a user's head and the speaker driver 29*b* may be a left speaker driver that is arranged to produce sound towards (or into) a user's left ear when the output device 10** is worn.

In one aspect, the one or more sensors 28 may be configured to detect (or sense) the environment (in which the audio output device is located) and produce sensor data based on the environment. For example, the sensors 28 may include at least one microphone that may be configured to convert acoustical energy caused by sound wave propagation into an input microphone signal (or audio signal). In some aspects, the microphone may be any type of microphone (e.g., a differential pressure gradient micro-electro-mechanical system (MEMS) microphone). In some aspects, the output device 10 may include a microphone that is an "external" (or reference) microphone that is arranged to capture sound from the acoustic environment, while having at least one other "internal" (or error) microphone that is arranged to capture sound (and/or sense pressure changes) inside a user's ear (or ear canal). In the case of the audio output device 10 being a headset (or headphones), the internal microphone may sense inside the user's ear when the headphone is positioned on (or in) the user's ear.

In another aspect, the sensors 28 may include an accelerometer that is arranged and configured to receive (detect or sense) speech vibrations that are produced while a user (e.g., who may be wearing the output device 10) is speaking, and produce an accelerometer signal that represents (or contains) the speech vibrations. Specifically, the accelerometer is configured to sense bone conduction vibrations that are transmitted from the vocal cords of the user to the user's ear (ear canal), while speaking and/or humming. For example, when the audio output device is a wireless headset, the accelerometer may be positioned anywhere on or within the headset, which may touch a portion of the user's body in order to sense vibrations.

In another aspect, the sensors 28 may include a camera (e.g., a complementary metal-oxide-semiconductor (CMOS) image sensor) that is capable of capturing digital images including image data that represent a field of view of the camera, where the field of view includes a scene of an environment in which the audio output device 10 is located. In some aspects, the camera may be a charged-coupled device (CCD) camera type. The camera is configured to capture still digital images and/or video that is represented by a series of digital images. In one aspect, the camera may be positioned anywhere about the output device 10. In some aspects, the device may include multiple cameras (e.g., where each camera may have a different field of view).

The head tracker 27 is configured to determine (measure) head-tracking data that indicates a position and/or an orientation of (e.g., a user who is wearing) the audio output device 10 within the physical environment 13. In one aspect, the tracker 27 may include an IMU that is designed to measure the position and/or orientation of the audio output device 10. In another aspect, the tracker 27 may include a (e.g., optical) proximity sensor that is designed to produce sensor data that indicates an object is at a particular distance from the sensor (and/or the audio output device 10), and from that distance determine the position (and/or orientation) of the audio output device 10. In another aspect, the head tracker 27 may include a Global Positioning System (GPS) sensor that may produce location data as head-tracking data.

In some aspects, the head tracker 27 may produce head-tracking data based on image data captured by one or more cameras. For example, the head tracker 27 may include one or more cameras that are arranged to capture image data from one or more point of views, which are directed in one or more directions away from the user (e.g., user's head). With the image data, the head tracker 27 may determine the position and/or orientation of the audio output device 10 using object recognition to detect one or more objects within the environment and/or to detect changes within the environment (e.g., detecting that an object is moving with respect to the audio output device 10).

In one aspect, the head tracker 27 may use (or include) separate sensors than those of the sensor(s) 28. In another aspect, the head tracker 27 may use (or be a part of) one or more of the sensors 28, e.g., a camera, to monitor and produce head-tracking data, as described herein. In another aspect, the sensor(s) 28 may include one or more electronic components of the head tracker 27, such as the IMU. As shown here, the head tracker 27 and/or sensors 28 may be a part of (or integrated into) the audio output device 10. In another aspect, at least some sensors 28 may be separate electronic devices that are communicatively coupled with the controller 26 (e.g., via the network interface 91). For instance, the audio output device 10 may receive sensor data from one or more sensors 28 (e.g., cameras within an environment in which the user is located), via a wireless (and/or wired) connection. Such sensors 28 may be used to determine head tracking data. For example, external cameras may capture image data of the user moving within the environment, and from the image data, the head tracker 27 may determine changes in the position and/or orientation of the user.

The controller 26 may be a special-purpose processor such as an application-specific integrated circuit (ASIC), a general-purpose microprocessor, a field-programmable gate array (FPGA), a digital signal controller, or a set of hardware logic structures (e.g., filters, arithmetic logic units, and dedicated state machines). The controller 26 is configured to perform audio signal processing operations and/or networking operations. The controller 26 may also be configured to receive sensor data (e.g., from the sensor(s) 28 and/or the head tracker 27) and perform one or more (e.g., audio signal) processing operations described herein based on the sensor data. In one aspect, the controller 26 may be configured to manage wireless connections with one or more electronic devices (e.g., electronic devices 76 and 77 shown in FIG. 1) using spatial audio by performing at least some of the operations describe herein. More about the operations performed by the controller 26 is described herein.

In one aspect, the controller 26 may be configured to perform (additional) audio signal processing operations based on elements that are coupled to the controller 26. For instance, when the audio output device 10 includes two or more "extra-aural" speakers, which are arranged to output sound into the acoustic environment rather than speakers that are arranged to output sound into a user's ear (e.g., as speakers of an in-ear headphone), the controller 26 may include a sound-output beamformer that is configured to produce speaker driver signals which when driving the two or more speakers produce spatially selective sound output. Thus, when used to drive the speakers, the output device may produce directional beam patterns that may be directed to locations within the environment.

In some aspects, the controller 26 may include a sound-pickup beamformer that can be configured to process the audio (or microphone) signals produced two or more external microphones of the output device 10 to form directional beam patterns (as one or more audio signals) for spatially selective sound pickup in certain directions, so as to be more sensitive to one or more sound source locations. In some aspects, the controller 26 may perform audio processing operations upon the audio signals that contain the directional beam patterns (e.g., perform spectrally shaping).

In another aspect, the controller 26 may perform other functions. For example, the controller 26 may be configured to perform an active noise cancellation (ANC) function to cause at least one of speaker drivers 29*a* and 29*b* to produce anti-noise in order to reduce ambient noise from the environment that is leaking into the user's ears. The ANC function may be implemented as one of a feedforward ANC, a feedback ANC, or a combination thereof. As a result, the controller 26 may receive a reference microphone signal from a microphone (e.g., of sensors 28) that captures external ambient sound. In another aspect, the controller 26 may perform any ANC method to produce the anti-noise. In another aspect, the controller 26 may perform a transparency function in which sound played back by the audio output device 10 is a reproduction of the ambient sound that is captured by the device's external microphone in a "transparent" manner, e.g., as if the headphone was not being worn by the user. The controller 26 processes at least one microphone signal captured by at least one external microphone, and filters the signal through a transparency filter, which may reduce acoustic occlusion due the audio output device being on, in, or over the user's ear, while also preserving the spatial filtering effect of the wear's anatomical features (e.g., head, pinna, shoulder, etc.). The filter also helps preserve the timbre and spatial cues associated with the actual ambient sound. In one aspect, the filter of the transparency function may be user specific according to specific measurements of the user's head. For instance, the controller may determine the transparency filter according to a head-related transfer function (HRTF) or, equivalently, head-related impulse response (HRIR) that is based on the user's anthropometrics. As an example, the controller may perform the transparency function such that at least some sound produced within the environment (e.g., sound being played back by the loudspeakers 15 of FIG. 1, for example) may be passed through and perceived by the user 14 along with (or in lieu of) the sound of the virtual sound sources 16 and/or 17.

In one aspect, the network interface 91 may communicate with one or more remote devices (e.g., the electronic device 21) and/or networks (e.g., network 93). For example, interface can communicate over known technologies such as Wi-Fi, 3G, 4G, 5G, Bluetooth, ZigBee, or other equivalent technologies. The interface can include wired or wireless transmitters and receivers that can communicate (e.g., receive and transmit data) with networked devices such as servers (e.g., the cloud) and/or other devices such as the electronic device and/or the audio playback device 18.

In one aspect, the (e.g., controller 26 of the) audio output device 10 may be configured to communicatively couple with the electronic device 21 (e.g., through the network interface 91), via the network 93, such that both devices may be configured to communicate with one another (e.g., to exchange audio data). In one aspect, the network 93 may be any type of computer network, such as a wide area network (WAN) (e.g., the Internet), a local area network (LAN), etc., through which the devices may exchange data between one another and/or may exchange data with one or more other electronic devices, such as a remote electronic server. In another aspect, the network may be a wireless network such as a wirelessly local area network (WLAN), a cellular network, etc., in order to exchange digital (e.g., audio) data. With respect to the cellular network, the audio output device 10 may be configured to establish a wireless (e.g., cellular) call, in which the cellular network may include one or more cell towers, which may be part of a communication network (e.g., a 4G Long Term Evolution (LTE) network) that supports data transmission (and/or voice calls) for electronic devices, such as mobile devices (e.g., smartphones). In another aspect, the devices may be configured to wirelessly exchange data via other networks, such as a Wireless Personal Area Network (WPAN) connection. For instance, the audio output device 10 may be configured to establish a wireless communication link (connection) with the electronic device via a wireless communication protocol (e.g., BLUETOOTH protocol or any other wireless communication protocol). During the established wireless connection, the electronic device may transmit data, such as audio data as data packets (e.g., Internet Protocol (IP) packets) to the audio output device. Thus, the audio output device 10 may be configured to establish a multipoint-to-point wireless connection with one or more electronic devices in order to receive audio data of which the audio output device spatially renders in order to produce virtual sound sources, as described herein.

As described herein, the system 20 also includes an optional audio playback device 18, which may be any electronic device (e.g., with electronic components) that is capable of performing audio signal processing operations and/or network operations. For example, the audio playback device may be a desktop computer, a laptop computer, a digital media player, etc. In one aspect, the device may be a portable electronic device (e.g., being handheld operable), such as a tablet computer, a smart phone, etc. In another aspect, the device may be a head-mounted device, such as smart glasses, or a wearable device that is arranged to be worn by a user, such as a smart watch.

As shown, the audio playback device 18 includes elements, such as a sensor 24 (e.g., a camera, etc.), a speaker driver 23, a display 25, a controller 22, and a network interface 92. In one aspect, the playback device may include more or fewer elements, such as having one or more sensors (e.g., a microphone, a camera, an IMU, etc.) and/or not having a speaker driver.

In some aspects, the display 25 is designed to present (or display) digital images or videos of video (or image) data. In one aspect, the display 25 may use liquid crystal display (LCD) technology, light emitting polymer display (LPD) technology, or light emitting diode (LED) technology, although other display technologies may be used in other aspects. In some aspects, the display 25 may be a touch-sensitive display screen that is configured to sense user input as input signals. In some aspects, the display may use any touch sensing technologies, including but not limited to capacitive, resistive, infrared, and surface acoustic wave technologies.

In one aspect, the (e.g., controller 22 of the) audio playback device 18 may be configured to perform at least some of the audio signal processing (and/or network) operations described herein as being performed by the audio output device 10 in order to manage device wireless connections. For example, the audio playback device 18 may be configured to establish a wireless (e.g., multipoint-to-point) connection with one or more electronic devices 21, and establish a (e.g., point-to-point) connection with the audio output device 10, and may be configured to perform operations to manage device connections using spatial audio. In particular, the audio playback device 18 may receive audio data form the electronic devices, spatially render the audio data to produce spatially rendered audio signals (e.g., binaural audio signals), and transmit the spatially rendered audio signals to the audio output device 10 for playback.

In one aspect, the audio playback device may spatially render the audio data (and/or perform one or more audio signal processing operations) based on user input. For example, the audio playback device may be configured to receive (e.g., through an input device, such as through the display when the display is a touch-sensitive display) user input, from which the audio playback device may be user-configured to perform one or more operations. For example, the audio playback device may adjust sound output of one or more virtual sound sources based on user input (e.g., based on the user adjusting a volume setting). More about adjusting spatial audio playback based on user input is described herein.

In another aspect, the audio playback device may operate as a "companion" device to the audio output device, where the audio output device performs the one or more operations described herein to manage device connections, while the playback device may communicate with the audio output device to perform one or more (e.g., additional) operations (e.g., to perform audio adjustments). In particular, the audio playback device may be paired with the audio output device, which is configured to perform the spatially rendering operations described herein to produce the virtual sound sources (e.g., receiving audio data from one or more electronic devices and spatially rendering that data, etc.), and may be figured to receive user input (e.g., through one or more input devices, as described herein), from which the audio playback device may transmit one or more control signals for the audio output device to perform one or more audio signal processing operations. Returning to the previous example, when the user adjusts a volume setting, the audio playback device may transmit a control signal to the audio output device, which may apply one or more scalar gains to one or more audio signals. In another aspect, user input may be received through the audio output device (e.g., through one or more buttons of the audio output device), and in response, the audio output device may perform one or more audio signal processing operations.

As described herein, the controllers 26 and/or 22 are configured to perform digital signal processing operations, such as audio signal processing operations and networking operations. In one aspect, operations performed by the controllers may be implemented in software (e.g., as instructions stored in memory (e.g., of the controllers) and executed by either controller) and/or may be implemented by hardware logic structures as described herein.

FIGS. 3-6 are flowcharts of processes 30, 40, 50, and 60, respectively, for performing one or more digital (e.g., audio) signal processing operations and/or network operations for managing multiple (or one or more) device connections using spatial audio. In one aspect, at least some of the operations may be performed by one or more devices of the system 20. For instance, at least some of the operations of processes 30, 40, and 50 may be performed by the (e.g., controller 26 of the) audio output device 10, while at least some of the operations of process 60 may be performed by (e.g., the controller 22 of) the audio playback device 18. As another example, at least some operations of processes 30, 40, and 50 may be performed by the audio playback device 18. More about the audio playback device performing these operations is described herein.

Figure 3:
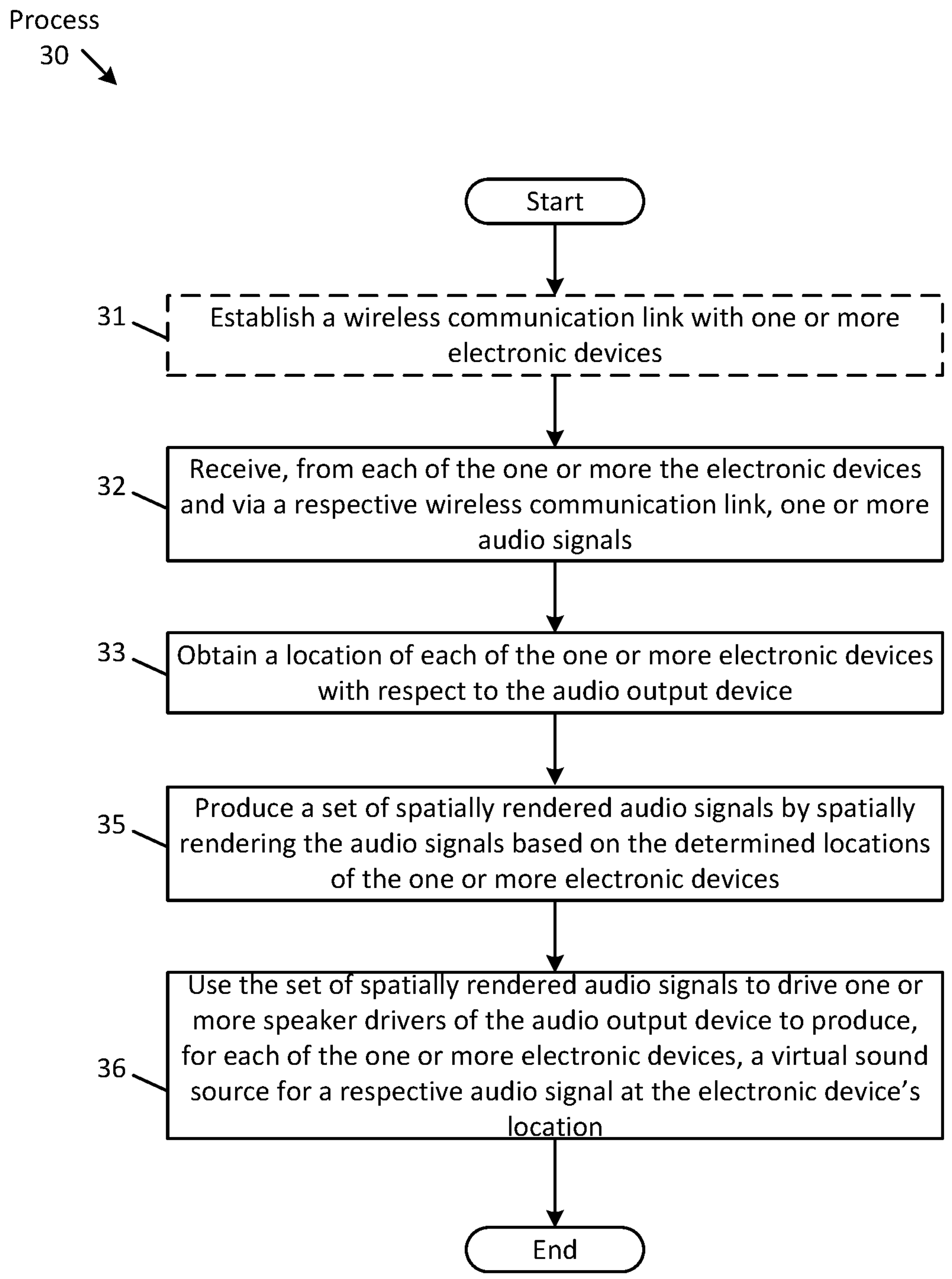
FIG. 3 is a flowchart of one aspect of a process performed by the headset to produce spatial audio of audio data received from one or more electronic devices via wireless connections.

Turning to FIG. 3, this figure is a flowchart of one aspect of the process 30 performed by the headset 10 to manage device connections by producing spatial audio of audio data wirelessly received from one or more electronic devices. The process 30 begins by the controller 26 establishing a wireless communication link with one or more electronic devices (at block 31). Specifically, the controller 26 may establish a multipoint-to-point wireless connection between multiple electronic devices and the audio output device 10, or a point-to-point wireless connection, when only one communication link is to be established with one electronic device. In one aspect the controller 26 may be configured (e.g., automatically) pair (e.g., via the network interface 91) with one or more wireless electronic devices. For instance, the controller may perform an auto pairing operation that allows the audio output device 10 to wirelessly pair with electronic devices (e.g., which may be known to the audio output device) when the audio output device comes within a threshold distance (e.g., a distance in which wireless devices may efficiently wirelessly communicate). In another aspect, the audio output device may operate in a discoverable mode in order to discover (or identify) wireless electronic devices within the threshold distance. In another aspect, the controller 26 may pair with an electronic device based on received parameters during an initial configuration (discovery) of the electronic device. For example, the parameters may indicate whether the electronic device is playing back audio content, an output loudness level (e.g., dB SPL) of the audio content, a location of the electronic device, and/or audio content characteristics (e.g., an identification of the audio program the audio content is associated with, a timestamp that indicates a moment during a playback duration at which the electronic device is currently playing back the audio content, etc.). In one aspect, the controller 26 may determine whether to establish a wireless link based on at least one of the received parameters. For instance, the audio output device may pair with an electronic device that is within a threshold distance of the audio output device, which may be determined based on a location of the audio output device (determined based on sensor data) and the location of the electronic device. As another example, the controller 26 may be configured to pair with the electronic device if the device is (currently) playing back audio content.

In one aspect, the controller 26 may pair with an electronic device when that device is within a physically audible range of the (e.g., user of the) audio output device 10. The physically audible range may be a distance at which a person may be able to hear sound that is being played back through one or more (e.g., in-device) speaker drivers of a device. In one aspect, the distance may be predefined. In one aspect, the controller may determine the physically audible range based on sensor data of the sensor(s) 28. For example, the controller may receive an input microphone signal produced by a microphone of the audio output device that is arranged to capture ambient sound. The controller may determine whether the input microphone signal includes one or more sounds (e.g., at or above a signal level), and if so, may determine that the electronic device is within the physically audible range. Responsive to determining that the electronic device is within the physically audible range, the controller may be configured to establish a wireless communication link with the electronic device (e.g., and begin receiving one or more audio signals, as described herein).

In another aspect, the controller may determine whether the electronic device is within a physically audible range based on one or more received parameters. For instance, the controller may determine whether the microphone signal includes the sound being produced by the electronic device by determining whether the input microphone signal includes (or is associated with) one or more audio content characteristics received by the electronic device (e.g., determining whether the captured sound is audio content of the audio program that is being played back by the electronic device). For instance, the controller may retrieve a portion of the audio content (e.g., from a remote sever via the network 93) based on an identification of the audio content and the timestamp, and may compare the portion with (a portion of) the audio signal to determine whether the sound being produced by the electronic device is being captured by the audio output device.

As another example, the controller may determine whether the device is within a physically audible range based on the device's output loudness level of its audio playback. For instance, the controller may determine a distance between the device and the audio output device based on sensor data (e.g., based on image data captured by one or more cameras), and may determine whether sound produced by the device at that loudness level would reach (e.g., at or above a sound level) the audio output device. To determine the sound output level at a particular distance, the controller may use a loudness model (e.g., based on the inverse square law) that outputs a loudness level in response to a distance and output loudness level as input. In one aspect, the controller may pair with electronic devices that are within a physically audible range to ensure that the electronic devices are within an environment in which the audio output device is located. For example, a user who is in the same room in which the electronic device is located may be able to hear in-device speaker driver playback, but may not be able to hear playback when the user is within a different room. In another aspect, the controller may use any method to determine whether a device that is within a physical audible range to the user.

In another aspect, the controller 26 may establish the wireless communication link based on a determination of whether the audio output device is in the same room as the electronic device. For instance, the controller 26 may be configured to determine whether the electronic device is within a field of view of the audio output device's camera by performing an object recognition algorithm upon image data captured by the output device's camera. Upon determining that the electronic device is within the field of view, the controller 26 may determine that both devices are in the same room. In another aspect, the controller 26 may use any method to determine whether the electronic device is within the same room as the audio output device.

In one aspect, the controller 26 may be configured to establish wireless links with electronic devices that are of interest to the user of the audio output device. For example, the controller may determine whether the user is moving towards an electronic device (e.g., for a period of time), and may establish the connection based on the user's movement. As another example, the controller may determine whether the electronic device is of user interest based on whether the user is looking at the device (e.g., for a period of time). For instance, the controller may determine whether the user is looking in the direction of the electronic device using the head tracking data of the head tracker 27. As another example, the controller may determine the user's gaze (e.g., based on image data captured by one or more cameras that are directed towards at least one eye of the user), and determine whether the gaze is in a direction of the electronic device.

The controller 26 receives, from each of the one or more electronic devices and via a respective wireless communication link, one or more audio signals (at block 32). Specifically, with a wireless communication link is established, the audio output device may (e.g., begin to) receive audio signals of an audio program that are being used by an electronic device to playback the audio program through its one or more in-device speaker drivers. For example, the electronic device may transmit the audio program as one audio channel (e.g., a mono audio signal) or one or more audio channels, such as a stereophonic recording or an audio recording in a multi-channel format, such as a 5.1-surround format. In another aspect, the electronic device may transmit one or more audio objects associated with an audio program, where each audio object includes one or more audio signals and includes spatial data that indicates a position within an acoustic space at which the audio object is to be rendered (e.g., as a virtual sound source). In another aspect, the audio program may be received in any audio format. In another aspect, the controller 26 may retrieve the one or more audio signals based on data received from the one or more electronic devices. For instance, the controller 26 may receive playback data, such as a title of a musical composition or a motion picture that may be (or is to be) played back by the electronic device. With the data, the controller may retrieve the audio signals, such as from a remote server or from local memory.

In one aspect, when a multipoint-to-point wireless connection is established, the audio output device may receive audio signals from multiple electronic devices contemporaneously. In another aspect, each of the electronic devices may (e.g., simultaneously) wirelessly transmit audio content (e.g., which is currently being played back by the electronic devices) to the audio output device, which is in contrast to conventional point-to-point wireless connections, where an output device receives audio content only from one electronic device.

The controller obtains (or determine) a location of each of the one or more electronic devices with respect to the audio output device (at block 33). In one aspect, the controller 26 may obtain the location of the electronic device based on received parameters from the electronic device, which may include location data (e.g., GPS data of a GPS sensor of the electronic device). In another aspect, the location of the electronic device may be determined based on the established wireless link. For instance, the output device may determine a position of the device with respect to the playback device based on a received signal strength indicator (RSSI) of the wireless connection. In another aspect, the controller 26 may determine the location based on sensor data of the audio output device's sensor(s) 28. For example, the controller may determine the electronic device's location based on image data captured by one or more cameras of the audio output device. In particular, the controller may perform object recognition upon the image data to determine whether (at least a portion of) the electronic device is within the image data (e.g., within a field of view of a camera). In response to determining that the electronic device is within the image data, the controller may determine the device's position based on the image data.

The controller 26 produces one or more (e.g., a pair of) spatially rendered (e.g., binaural) audio signals by spatially rendering one or more audio signals (received from the electronic devices) based on the determined locations of the one or more electronic devices (at block 35). Specifically, the controller 26 uses the locations to determine (or estimate) spatial characteristics, and use the characteristics to select one or more spatial filters, such as Head-Related Transfer Functions (HRTFs), or equivalently one or more Head-Related Impulse Responses (HRIRs), which when applied to the one or audio signals produce spatial audio (e.g., binaurally rendered audio signals). In one aspect, the controller may apply location-specific HRTFs to audio signals of each electronic devices to produce spatially rendered audio signals for each electronic device, and may mix the spatially rendered audio signals to produce output binaurally rendered audio signals.

The controller 26 uses the spatially rendered audio signals to drive one or more speaker drivers of the audio output device to produce, for each of the one or more electronic devices, a virtual sound source for a respective (one or more) audio signal(s) at the electronic device's location (at block 36). Specifically, by the audio output device producing the spatialized audio, the user perceives audio content of each electronic device at (or near) the location of the electronic device, such as shown with the virtual sound sources 16 and 17 for electronic devices 76 and 77, respectively, in FIG. 1.

As described herein, the audio output device receives audio data from one or more electronic devices, and produces virtual sound sources for the audio data at locations of the devices. In one aspect, the of the electronic device may be playing back its audio signal(s), prior to the audio output device's playback of the produced spatially rendered audio signals, and may cease playback once the audio output device produces the device's virtual sound source. For example, prior to the audio output device receiving an electronic device's audio signal, the device may use the audio signal to drive an in-device speaker driver to playback sound. Once the audio output device uses the spatially rendered audio signals to drive the audio output device's speaker drivers, the electronic device may cease to use the audio signal to drive its speaker driver. Thus, audio playback may switch (transition) from the electronic device's in-device speaker drivers to the audio output device's speaker drivers.

In one aspect, the audio playback transition may be seamless. For example, the electronic device may cease playback of an audio program at a particular moment within a playback duration, while the audio output device begins playback (by using the spatially rendered audio signals to drive its speaker drivers) at or after the particular moment within the playback duration (e.g., using the playback characteristics describe herein). For example, when the controller 26 retrieves the audio data based on playback data, the electronic device may provide the output device with a timestamp during the playback duration at which the electronic device is playing back the audio content. The output device may begin playback of the audio content at or after that timestamp (at which point the electronic device may cease playback). In another aspect, the system may cross-fade playback from the electronic device to the output device. In which case, the output device may fade in playback of the audio content, while the electronic fades out playback.

In another aspect, the electronic device from which the audio output device receives one or more audio signals may not be playing back audio content prior to the audio output device's audio playback. In which case, the audio signals that are received may be of an audio program that was previously being played back by the electronic device. As another example, the audio signals may be of a predefined audio program that is to be transmitted to the audio output device.

In one aspect, the controller may omit the operations of block 31, which is an optional block (shown as having dashed boundaries), when the audio output device has already established wireless links with the electronic devices. In one aspect, the audio output device may establish the wireless communication link with a device, upon determining the location of the electronic device. For example, the audio output device may determine whether an obtained location of an electronic device is within a threshold distance (e.g., within the physically audible range), at block 33. If so, the controller 26 may be configured to establish the wireless communication link with the device. This may ensure that the audio output device wirelessly connects with electronic devices that are close (or in proximity) to the user of the audio output device.

Figure 4:
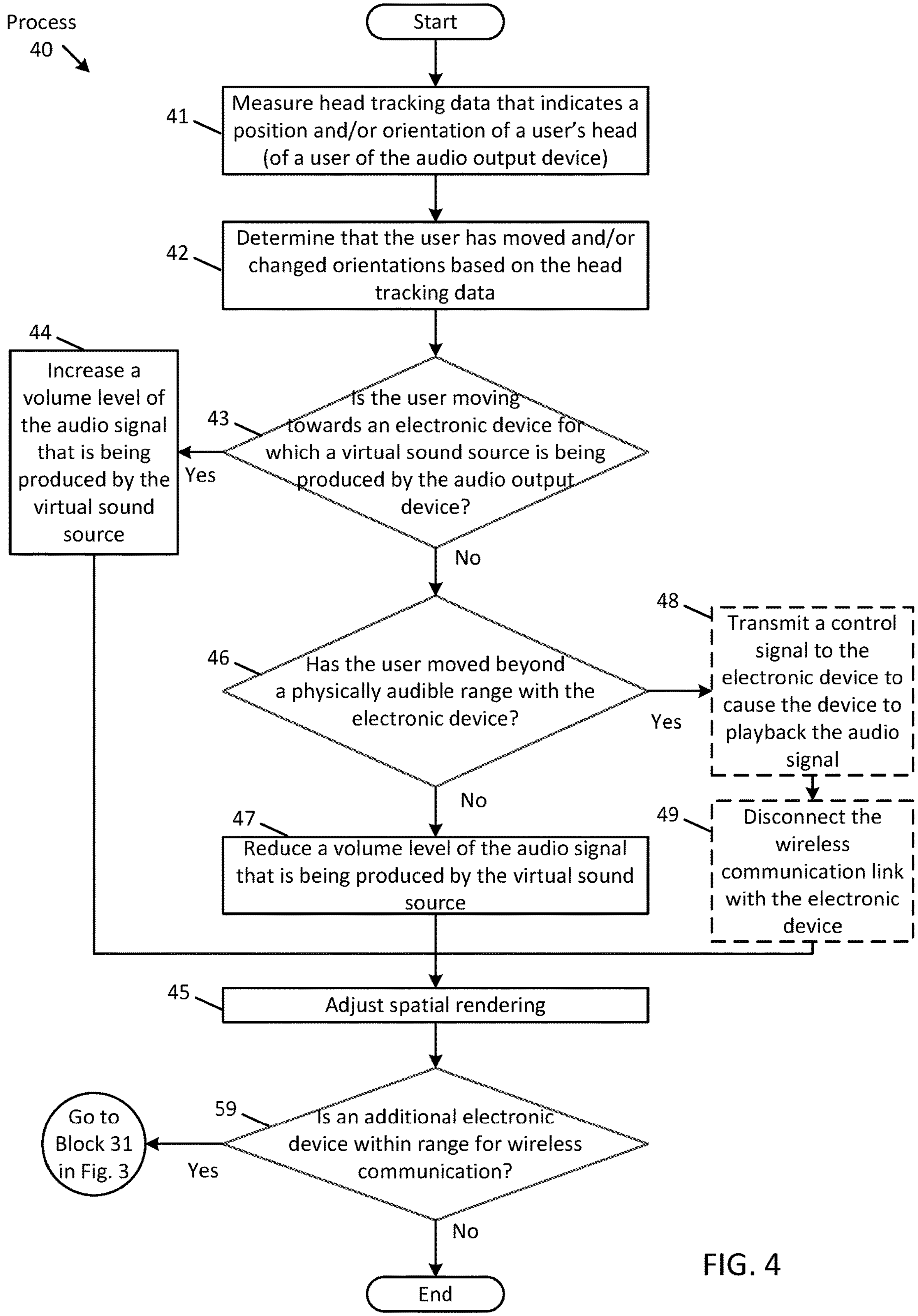
FIG. 4 is a flowchart of one aspect of a process for managing wireless connections with electronic devices using spatial audio.

FIG. 4 is a flowchart of one aspect of a process 40 for managing wireless connections with electronic devices using spatial audio. In one aspect, at least some of the operations of this process may be performed after (or in addition to) the process 30 of FIG. 3 to establish wireless connections with the electronic devices and use audio content from those devices to produce virtual sound sources for (at least some of) the devices. In one aspect, (at least some of the operations of) the process 40 may be performed once the audio output device 10 has established one or more wireless communication links with one or more electronic devices and is producing virtual sound sources for those devices.

The process 40 begins by the controller 26 measuring (or receiving) head tracking data that indicates a position and/or orientation of a head of a user of the audio output device (at block 41). In particular, the controller 26 may receive the head tracking data from the head tracker 27. In one aspect, the head tracking data may include (e.g., spherical or cartesian) coordinates of the (e.g., user's head which may be wearing the) audio output device 10, and/or may include rotational data that indicates the orientation of the audio output device 10 (and therefore the user's head). The controller 26 determines that the user (e.g., the audio output device 10) has moved and/or changed orientations based on the head tracking data (at block 42). For instance, the controller 26 may compare the currently measured head tracking data with previously measured tracking data to determine whether the position and/or pose of the user's head has changed.

The controller 26 determines whether the user (or more specifically the audio output device 10) is moving towards an electronic device for which a virtual sound source is being produced by the audio output device 10 (at decision block 43). In particular, the controller 26 determines whether the audio output device 10 is moving towards an electronic device based on sensor data, such as head tracking data. Specifically, the controller 26 may compare the movement of the user to the obtained location of the electronic device with respect to the audio output device 10 determined at block 33 of process 30 in FIG. 3. Responsive to determining that the audio output device 10 is moving towards an electronic device, the controller 26 increases a volume level of the audio signal that is being produced by the virtual sound source of the electronic device (at block 44). In particular, the controller may increase the sound output of a virtual sound source by applying a (e.g., scalar) gain to the one or more audio signals (which are being received from the electronic device) that are being spatially rendered to produce the virtual sound source. As described herein, the volume level may be a loudness level of sound output by the audio output device, as perceived by the user that is associated with the virtual sound source. In some aspects, the controller 26 may determine the scalar gain that is to be applied based on the distance between the electronic device and the audio output device 10 (and/or based on a current output level of the virtual sound source). For example, the controller 26 may determine a required loudness level based on the inverse square law. In another aspect, the controller 26 may use a volume model which outputs a scalar gain based on input, such as the distance between the electronic device and the audio output device and/or a current output level of the virtual sound source.

The controller 26 adjusts the spatial rendering (at block 45). In particular, the controller 26 may spatially render the audio signals according to the head tracking data (e.g., the changed position and/or changed orientation) of the audio output device such that the virtual sound source(s) that are being produced by the audio output device are maintained at their respective locations (e.g., the locations of their respective electronic devices), regardless of the changed position and/or changed orientation of the audio output device. For example, to maintain the positions of the virtual sound sources, the controller 26 may select (determine) different spatial filters based on the head tracking data. In addition (or in lieu of) adjusting spatial rendering based on the head tracking data, the controller 26 may use the gain-adjusted audio signal(s) that were produced based on the user's movement towards the electronic device to produce the spatially rendered audio signals (e.g., by applying one or more spatial filters).

Returning to decision block 43, responsive to determining that the user is not moving towards the electronic device, the controller 26 may determine whether the user has moved beyond a physical audible range (or beyond a threshold distance) of the electronic device (at decision block 46). For instance, rather than moving towards the electronic device, the user may be moving away from an electronic device, and the controller 26 may determine whether the user has moved far away enough that the user would be unable to hear sound (of the audio content produced using in-device speaker drivers) of the electronic device. In one aspect, the controller 26 may determine the physically audible range, as described herein (e.g., based on parameters of the electronic device and/or audio content characteristics). In another aspect, the controller 26 may determine whether the user has move beyond the range based on whether the user remains within a same room as the electronic device (e.g., based on image data captured by one or more cameras of the audio output device). Responsive to determining that the user has moved beyond the physically audible range (e.g., the user has left the room in which the electronic device is located), the controller 26 transmits a control signal to the electronic device to cause the device to (e.g., continue) playback of the audio signal (at block 48). As described herein, the electronic device may playback the audio signal prior to the audio output device 10 producing the device's respective virtual sound source. As a result, since the audio output device 10 is outside the range, playback of the audio signal may switch back to the electronic device. In another aspect, the electronic device may cease playback all together. In either case, the audio output device 10 may transmit the control signal. The controller 26 may disconnect the wireless communication link with the electronic device (at block 49). In another aspect, the audio output device may remain connected to the electronic device (e.g., up to a threshold distance, which may be based on wireless connectivity).

The controller 26 adjusts spatial rendering by ceasing to use the audio signal(s) of the electronic device to produce the spatially rendered audio signals (at block 45). For example, if the controller 26 is producing several virtual sound sources for several electronic devices, the controller 26 may spatially render audio signals of electronic devices that remain within the physically audible range of the output device 10, while ceasing to spatially render audio signals associated with electronic devices outside the range. In one aspect, when the electronic device is the only device that a virtual sound source is being produced, the controller 26 may cease to use the spatially rendered audio signals to drive the audio output device's speaker driver(s).

Returning to decision block 46, responsive to determining that the user has not moved beyond the physically audible range, meaning that the user is moving away from the electronic device but is still within audible range of the (e.g., in-device speaker drivers of the) device, the controller 26 reduces a volume level of the audio signal that is being produced by the virtual sound source of the electronic device (at block 47). For example, the controller 26 may apply a scalar gain upon the audio signal to attenuate its signal level. The controller 26 then adjusts the spatial rendering at block 45, such that sound output of the electronic device's virtual sound source is reduced (due to the attenuation of the audio signal), as described herein.

The controller 26 determines whether there are any additional electronic devices within (e.g., physically audible) range for wireless communication (at decision block 59). For example, the controller 26 may remain in a wireless discovery mode in order to continue to try initiating wireless communication with electronic devices nearby. If there is an additional device, the controller 26 may go to block 31 of process 30 in FIG. 3 in order to establish communication and spatially render one or more audio signals received from the device, as described herein.

Figure 5:
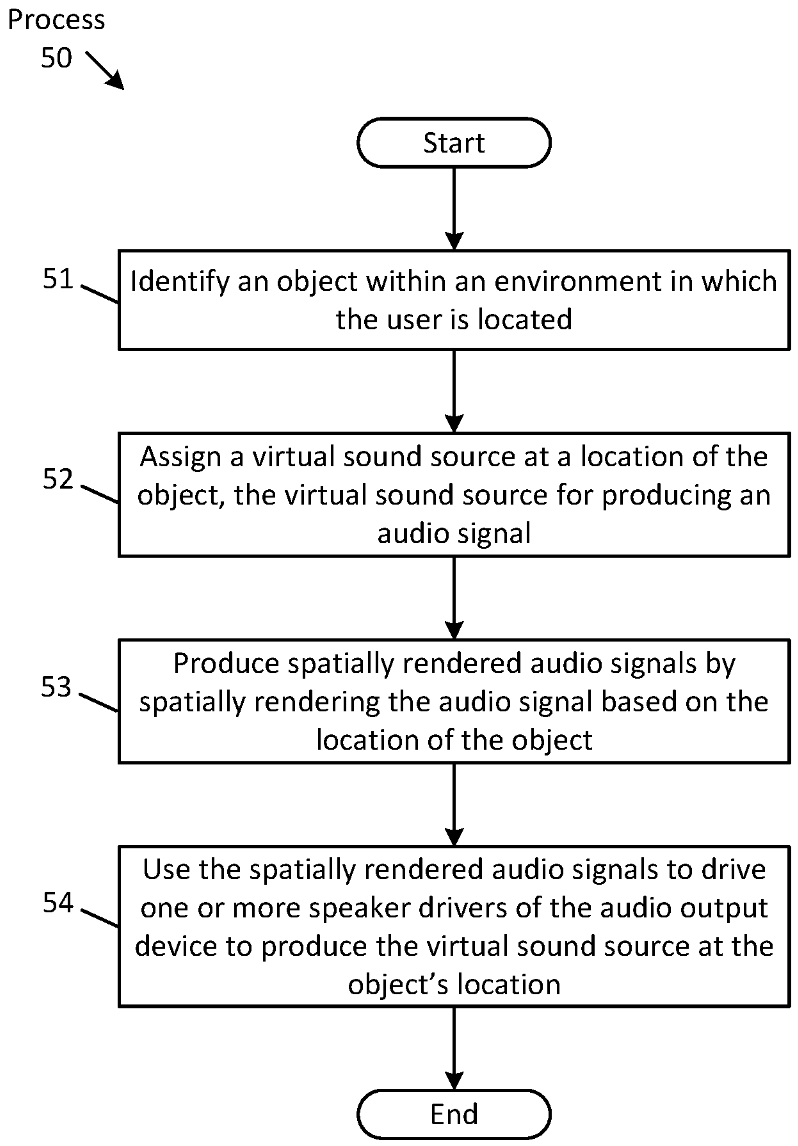
FIG. 5 is a flowchart of one aspect of a process for assigning a virtual sound source to an object.

As described herein, the audio output device 10 spatially renders audio content from electronic devices in order to produce virtual sound sources at locations of those devices. In another aspect, the audio output device 10 may be configured to produce virtual sound sources at various locations within an environment, where those locations may not be associated with electronic devices that provide audio content for those sound sources. FIG. 5 is a flowchart of one aspect of a process 50 for assigning a virtual sound source to an object within an environment. In one aspect, the process 50 may be performed based on user input. For example, the controller 26 may perform at least some of the operations of the process 50 in response to a user command (e.g., a voice command detected by the audio output device 10 based on performing a voice recognition algorithm upon one or more input microphone signals captured by one or more microphones of the audio output device). In another aspect, the operations may be performed in response to user input via an input device (e.g., via the touch-sensitive display 25 of the audio playback device 8) that is communicatively coupled with the audio output device 10. More about the operations being performed based on user input is described herein.

The controller 26 identifies an object (or a location) within an environment in which the user is located (at block 51). Specifically, the controller 26 identifies the object (or location) using sensor data from one or more sensors 28. For instance, a camera of the audio output device 10 may capture image data, and the controller 26 may perform an object recognition algorithm upon the image data to identify an object. In another aspect, the object may be identified based on user input. For example, the captured image data may be displayed on a display (e.g., display 25) that is communicatively coupled with the audio output device 10. The controller 26 may identify the object based on a user selection (e.g., by the user touching the object displayed on the touch-sensitive display) of the object.

The controller 26 assigns a virtual sound source at a location of the object, the virtual sound source for producing an audio signal (at block 52). In particular, upon identifying the object, the controller 26 may assign the virtual sound source by determining the location of the object (e.g., with respect to the audio output device), as described herein. With the determined location, the controller 26 may associate the location with the audio signal. In one aspect, the audio signal may be a predefined audio signal. In another aspect, the audio signal may be user-defined (e.g., through a graphical user interface (GUI) of a display that is communicatively coupled with the audio output device 10, where the user may select a user interface (UI) item that is associated with the audio signal). For example, when the identified object is an oven, the user may assign an alarm noise to be associated with the virtual sound source. In which case, the user may assign a time (or one or more periods of time) at which the virtual sound source may produce sound (to assign a sound after a period of time). In another aspect, the controller 26 may automatically assign an audio signal based on the identified object. For example, when the object is a radio, the controller 26 may assign a musical composition.

The controller 26 produces spatially rendered audio signals by spatially rendering the audio signal assigned to the object based on the location of the object (at block 53). In particular, the controller 26 may retrieve the audio signal from memory (e.g., local memory of the audio output device or a remote memory, such as memory of the audio playback device). In some aspects, the controller may stream (e.g., via the network 93) the audio signal from a remote server. With the audio signal, the controller 26 may spatially render (e.g., applying one or more HRTFs to) the audio signal according to the location of the object. The controller uses the spatially rendered audio signals to drive one or more speaker drivers of the audio output device to produce the virtual sound source at the object's location (at block 54).

In one aspect, the controller 26 may be configured to adjust the spatial rendering using head tracking data, as described herein. In another aspect, the controller 26 may be configured to perform at least some operations of processes 30, 40, and 50 of FIGS. 3-5, respectively. For example, the controller 26 may be configured to produce virtual sound sources for one or more electronic devices, where each electronic device transmits one or more audio signals for its respective virtual sound source and/or may be configured to produce a virtual sound source for an object, as described in process 50 of FIG. 5.

Figure 6:
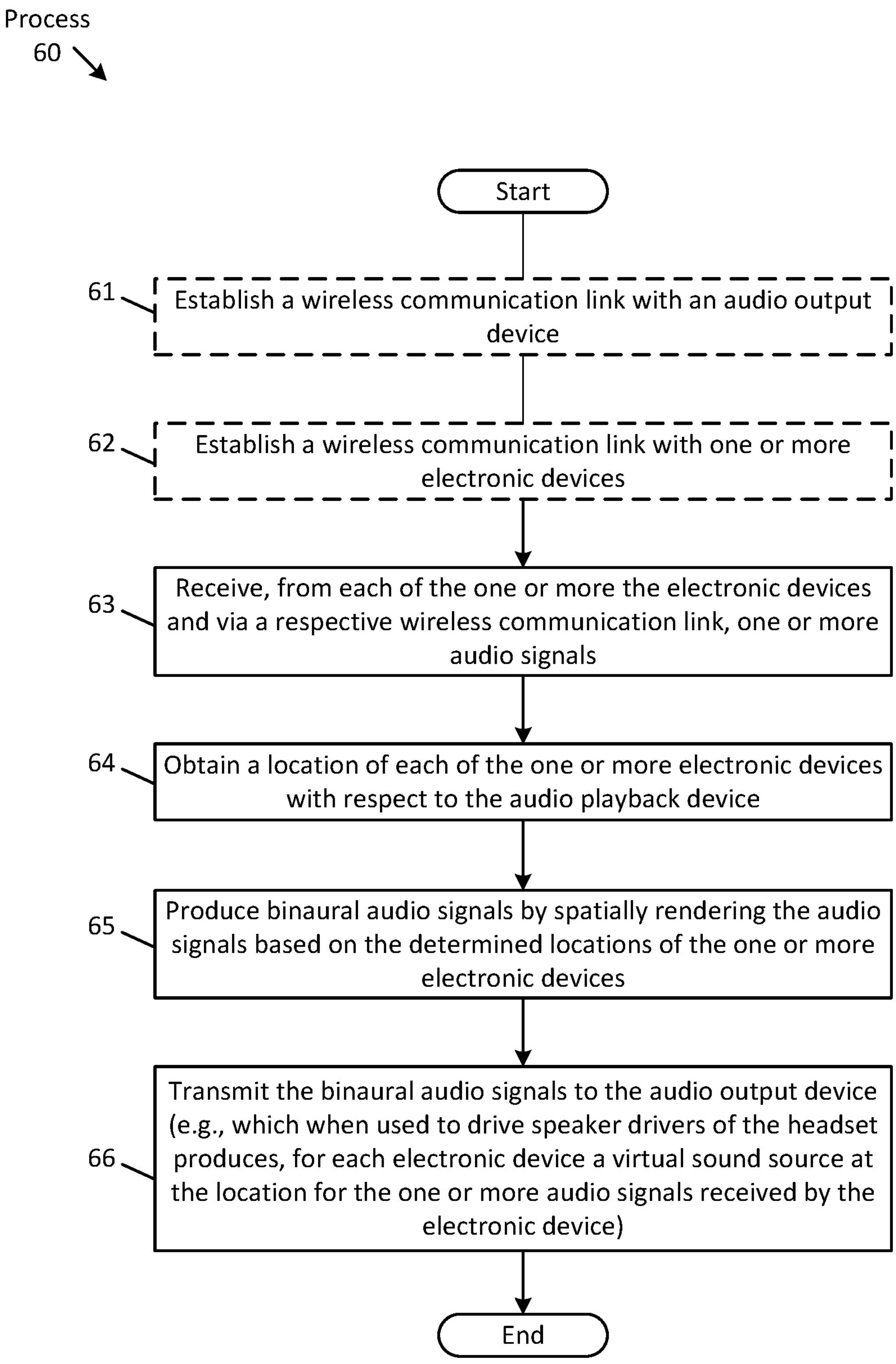
FIG. 6 is a flowchart of a process performed by an audio playback device for producing a set of spatially rendered audio signals for managing wireless connections with electronic devices and transmitting the set of spatially rendered audio signals to a headset for playback.

As described thus far, the (e.g., controller 26 of the) audio output device 10 may be configured to manage multi-device connections using spatial audio. In another aspect, at least some of the operations described herein may be performed by the audio playback device 18 that is communicatively coupled with the audio output device. FIG. 6 is a flowchart of a process 60 performed by (e.g., the controller 22 of) an audio playback device for producing spatially rendered audio signals for managing wireless connections with electronic devices and transmitting the spatially rendered audio signals to a headset for playback.

The process 60 begins by the controller 22 establishing a wireless communication link with the audio output device 10 (at block 61). The controller 22 establishes a wireless communication link with one or more electronic devices (at block 62). In particular, the audio playback device 18 establishes a multipoint-to-point connection with the electronic devices and establishes a point-to-point connection with the audio output device 10. The controller 22 receives, from each of the one or more electronic devices and via a respective wireless communication link one or more audio signals (at block 63). The controller 22 obtains a location of each of the one or more electronic devices with respect to the audio playback device (at block 64). In one aspect, this may be the case when both the audio playback device 18 and the audio output device 10 are being held, carried by, and/or worn by the user. In another aspect, the audio playback device 18 may determine the locations of the electronic devices with respect to the audio output device 10 (e.g., which may be the case when the playback and output devices are not being held by the user).

The controller 22 produces spatially rendered audio signals by spatially rendering the audio signals based on the determined locations of the one or more electronic devices (at block 65). In one aspect, to produce the spatially rendered audio signals, the controller 22 may receive location data of the user of the device. For instance, the audio playback device may (e.g., include or) receive head tracking data from a head tracker (e.g., of the audio output device 10), from which the audio playback device may determine the position of the listener. The controller 22 transmits the spatially rendered audio signals to the audio output device 10 (e.g., which may be worn by the user), and which when used to drive speaker drivers of the audio output device produces, for each electronic device a virtual sound source at the location for the one or more audio signals received by the electronic device (at block 66). In another aspect, rather than (or in addition to) transmitting the binaural audio signals, the audio playback device may use at least some of the spatially rendered audio signals to one or more speaker driver(s) 23 of the playback device 18.

As described herein, the one or more electronic devices may be playing back their audio content prior to the audio playback device receiving the one or more audio signals. In one aspect, the one or more electronic devices may cease playing back their respective audio content after the audio playback device transmits the spatially rendered audio signals to the headset for playback. Thus, audio playback may transition from the electronic devices to the headset in a seamless manner.

Some aspects perform variations of the processes 30, 40, 50, and/or 60 described in FIGS. 3-6, respectively. For example, the specific operations of at least some of the processes may not be performed in the exact order shown and described. The specific operations may not be performed in one continuous series of operations and different specific operations may be performed in different aspects. For example, the operations within dashed boxes may be optional operations that may not be performed while a respective process is performed. For example, the audio playback device 18 and the audio output device 10 may already have an established wireless communication link, and therefore may not need to establish the wireless communication link with the audio output device 10, as described in block 61 when the controller 22 performs the process 60 in FIG. 1.

As described thus far, the system 20 (e.g., the audio output device 10 and/or the audio playback device 8) may be configured to manage multi-device connections by performing one or more operations. In particular, at least some of these operations may be automatic (e.g., without user intervention). For instance, the audio output device 10 may manage connections by adjusting sound output of one or more virtual sound sources based on movement of the user (who is wearing or has the audio output device 10) with respect to electronic devices associated with the virtual sound sources (e.g., by adjusting sound output of virtual sound sources based on the user's location with respect to the virtual sound sources), as described in FIG. 4.

In one aspect, the (e.g., controller 22 of the) audio playback device 18 may perform at least some of the operations described herein that may be performed by the (e.g., controller 26 of the) audio output device 10. For instance, the controller 22 may be configured to establish a wireless link with an electronic device and begin to receive an audio signal in response to determining that the electronic device is within a physically audible range (of the audio playback device 18 and/or the audio output device 10).

Figure 7:
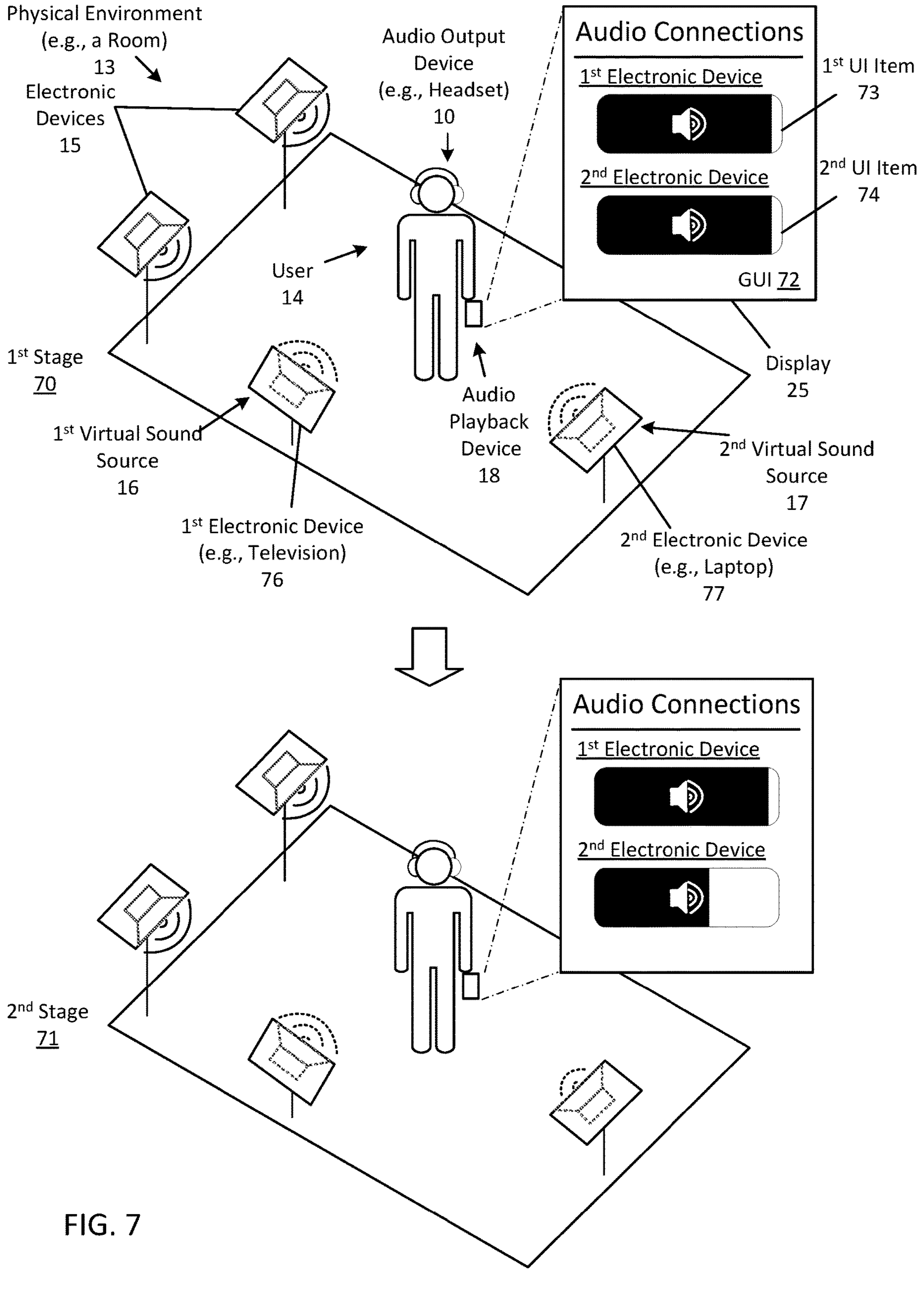
FIG. 7 shows several stages in which a user adjusts the sound output of a virtual sound source associated with an electronic device according to one aspect.
Figure 8:
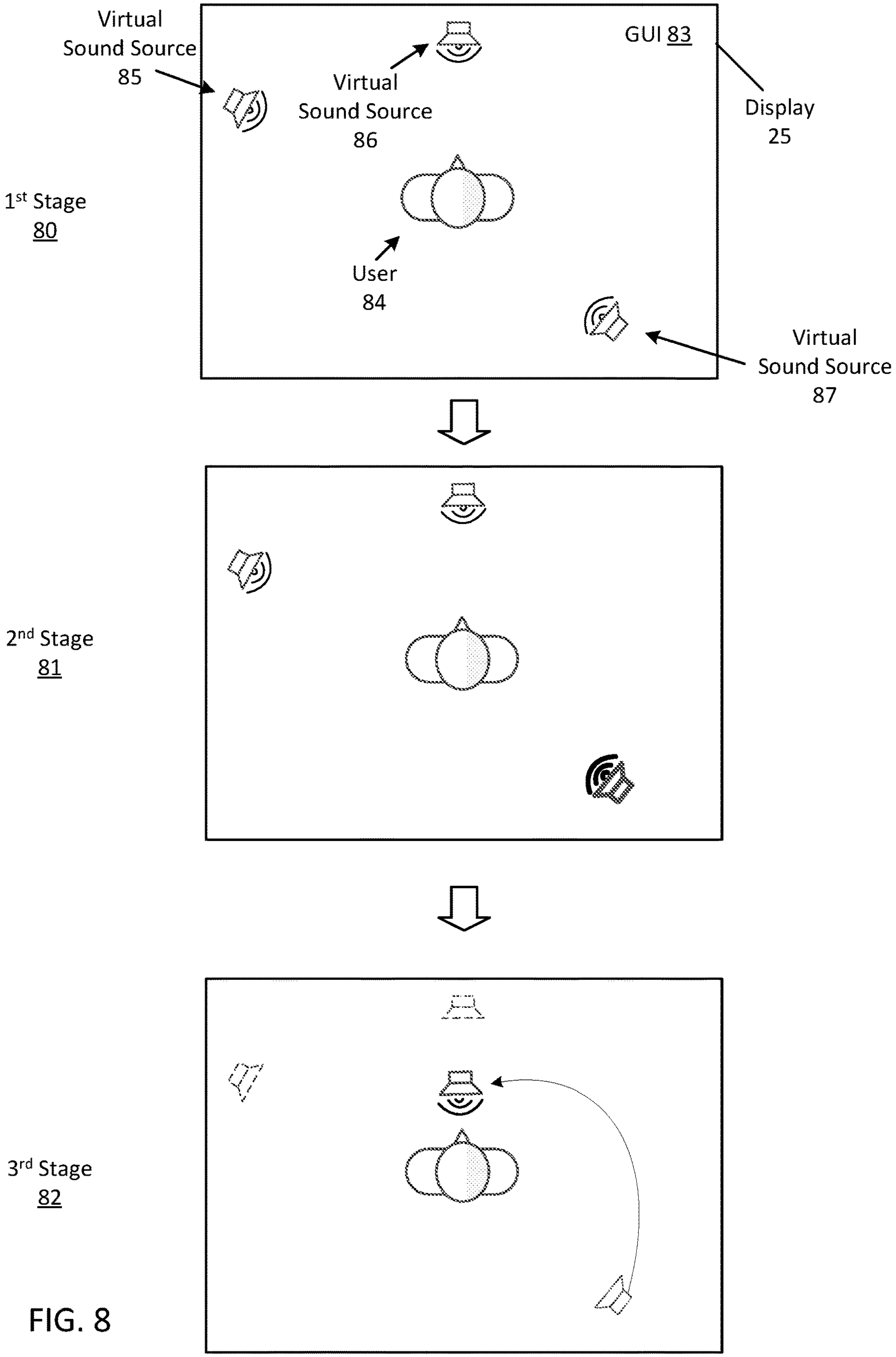
FIG. 8 shows several stages of a graphical user interface displayed on a display of an audio playback device in which a virtual sound source is produced as direct sound while other virtual sound sources are produced as ambient sound according to one aspect.

In another aspect, some operations performed by the audio output device 10 (and/or the audio playback device 8) may be performed based on user input. In particular, the system 20 may adjust spatial audio playback according to user input. For instance, the audio output device 10 may determine that a virtual sound source is of interest to the user, which may be based on sensor data (e.g., based on image data that indicates the user's gaze is towards a direction (or location) of a virtual sound source), and/or based on user input (e.g., through a voice command, input received through an input device, such as user selections of one or more UI items in a GUI displayed on the display 25 of the audio playback device, etc.). Upon determining that the virtual sound source is of interest to the user, the user may provide one or more instructions (e.g., through user input) for adjusting sound playback of that virtual sound source, such as adjusting sound output or muting a virtual sound source. FIGS. 7 and 8 are examples of spatial audio playback adjustments based on user input.

As described herein, the operations performed in FIGS. 7 and 8 may be performed by the audio playback device 18. In another aspect, at least some operations may be performed by the audio output device 10.

FIG. 7 shows several stages in which a user adjusts sound output of a virtual sound source associated with an electronic device according to one aspect. Specifically, this figure is showing two stages 70 and 71, each stage showing the physical environment 13 that includes electronic devices 5-7 and the user 14. The user 14 is wearing the audio output device 10 (e.g., a headset) and is holding an audio playback device 18 (e.g., a smart phone). The audio output device 10 is playing back spatial audio of the first and second electronic devices 76 and 77, such that the user perceives the first virtual sound source 16 at a location of the first electronic device and perceives the second virtual sound source 17 at a location of the second electronic device. In one aspect, the audio playback device 18 may be receiving one or more audio signals from each electronic device and may be spatially rendering the audio signals to produce spatially rendered audio signals, which it transmits to the audio output device for playback, as described herein. In another aspect, the audio output device 10 may be receiving the audio signals from the electronic devices and may be spatially rendering the signals for playback, as described herein. In that case, the audio playback device 18 may be communicatively coupled with the audio output device 10 and may be operating as a companion device, which may be configured to receive (e.g., through an input device, such as a touch-sensitive display screen) user input for adjusting playback at the audio output device. In particular, the audio playback device 18 may receive user input, and in response, transmit one or more control signals to the audio output device 10, which may then perform one or more audio signal processing operations to adjust playback, as described herein.

Each stage also shows an Audio Connections GUI 72 that is being displayed on the display 25 of the audio playback device. The GUI 72 lists the electronic devices that are communicatively coupled with the (e.g., audio output device 10 of the) system 20, and for which the audio output device 10 is producing virtual sound sources. For each listed electronic device, the GUI 72 includes a UI item (e.g., volume control) for adjusting the sound output (e.g., volume) for each respective electronic device. In particular, the GUI 72 includes a first UI item 73 for adjusting the sound output of the virtual sound source 16 of the first electronic device 76 and includes a second UI item 74 for adjusting the sound output of the virtual sound source 17 of the second electronic device 77. The UI items are sliders, which are configured to adjust the sound output (volume) level based on a linear user adjustment (e.g., selecting a portion of the slider and moving it in one of two directions).

Turning to the first stage 70, this stage shows that the volume level of both virtual sound sources is high (or above a threshold). Specifically, both volume levels are at a same setting, such that the user perceives both virtual sound sources at a same (or similar) level. The second stage 71 shows that the user has adjusted the second UI item 74. In particular, the user has reduced the volume level (e.g., by selecting the UI item 74 and moving the slider to the left). As a result, the sound output of the second virtual sound source has been reduced (shown by reducing the number of dashed curves being emitted by the second virtual sound source 17 from three curves to two curves). Thus, the user may (e.g., manually) adjust the volume level of individual virtual sound sources, as opposed to the volume level being automatically adjusted based on movement of the user, as described herein. As a result, this allows the user to have more control over how to manage the spatial audio output of different virtual sound sources.

As described herein, the GUI 72 includes UI items for controlling sound output of virtual sound sources that are being produced by the audio output device. In another aspect, the GUI 72 may include one or more other UI items for controlling other aspects of the spatial audio output of the audio output device 10. For example, the GUI may include a UI item that allows the user to remove (or add) virtual sound sources. For instance, when adding a virtual sound source, the GUI may indicate that there is an electronic device nearby, for which the audio output device may produce spatial audio. Upon receiving an indication that to add a virtual sound source (e.g., by receiving a user selection of a UI item, for example), the audio output device may begin producing the virtual sound source (e.g., a "add this device" UI item). This may allow the user to control which virtual sound sources the user wishes to hear. To remove a virtual sound source, the audio output device may receive an indication that the user does not wish to hear sound from a particular virtual sound source (e.g., based on a user selection of a UI item), and in response, the audio output device may cease using spatially rendered audio signals of the spatially rendered audio signal(s) associated with that sound source.

In another aspect, the audio playback device 18 (or the audio output device 10) may be configured to cause an electronic device to (e.g., continue) playback through its in-device speaker drivers. For instance, the playback device may determine that the electronic device is to playback its associated audio signal(s), which may be based on user input. The playback device 18 may transmit a control signal to the electronic device to cause the device to playback the audio signal(s), and the audio output device 10 may cease using the spatially rendered audio signals of the device's audio signal(s) to drive the audio output device's speaker drivers (e.g., based on the audio playback device 18 ceasing to transmit the audio signals to the audio output device 10). For instance, the GUI 72 may include a UI item for controlling audio signal playback of the electronic device, and responsive to determining that the UI item has been selected by the user, the system transmits one or more control signals to the electronic device to cause playback at the device, while ceasing to transmit the spatially rendered audio signals to the audio output device for playback. As a result, the playback device 18 may allow the user to decide which virtual sound sources the audio output device 10 is to play back.

In some aspects, the audio playback device 18 may include one or more other controls for allowing the user to manage spatial audio output. For example, the GUI 72 may include other UI items for controlling other audio signal processing operations for each (or at least one) electronic device. For example, the GUI may include an equalizer for adjusting spectral content across one or more frequency ranges (e.g., low-frequency, mid-frequency, and high-frequency). As another example, the audio playback device 18 (and/or the audio output device 10) may include one or more controls for muting one or more virtual sound sources. For instance, the audio playback device 18 may receive an indication that a virtual sound source is to be muted (e.g., by a user selection of a mute UI item associated with the electronic device of the virtual sound source in the GUI 72), which when selected causes the audio output device 10 to cease spatial audio playback of that device's virtual sound source, while continuing to spatially render other virtual sound sources, as described herein. More about other operations are described herein.

In one aspect, the audio playback device may adjust sound output to emphasize sound of one or more virtual sound sources (e.g., making the sound sources more perceivable to the user) over sound of other sound sources. For instance, the controller (e.g., controller 26 and/or controller 22) may determine whether a virtual sound source is of interest to a user, and in response, may emphasize the sound of that sound source over other sound sources that are currently being produced by the audio output device. An example of this is illustrated in FIG. 8, which shows three stages 80, 81, and 82 of a GUI 83 displayed on a display 25 of the audio playback device 18 in which sound of a virtual sound source is produced as direct sound while sound of other virtual sound sources are produced as ambient sound according to one aspect. In which case, the controller may emphasize a sound source by producing the source as direct sound and/or may emphasize a source by reproducing other sources as ambient sound. As used herein, "direct sound" may be correlated sound that may be reproduced by the audio output device. For instance, to reproduce a virtual sound source as direct sound, the audio output device may drive the speaker drivers of the audio output device with correlated audio signal(s). In one aspect, direct sound may be sound that originates from a particular direction (e.g., in front of the user), whereas ambient sound may be diffuse sound that may not originate from a particular direction or location. In one aspect, "ambient sound" as used herein, may be decorrelated sound that may be reproduced by the audio output device. In one aspect, to produce ambient sound, the audio output device 10 may be configured to perform one or more audio signal processing operations on one or more audio signals of a virtual sound source. For example, for a virtual sound source, the audio output device may produce an ambient sound signal of the source's audio signal by applying reverberation to the audio signal. As another example, the audio output device may apply one or more audio filters (e.g., a low-pass audio filter) to the audio signal. In another example, the audio output device may apply one or more scalar gains to reduce a signal level of the audio signal.

Returning to FIG. 8, this figure shows three stages 80-82, each stage showing the GUI 83 of a top-down view of a configuration of virtual sound sources as (or represented by) UI items 85, 86, and 87 with respect to a virtual representation (or avatar) of the user 84 that is displayed on the display 25 of the audio playback device. Thus, this GUI is showing the configuration on a (e.g., X-Y) plane, of the physical environment 13, at the center of which is the user 14. In one aspect, the avatar of the user 84 may represent the location of the audio output device 10 that is being worn by the user 14.

The first stage 80 shows the configuration of UI items that represent virtual sound sources with respect to the avatar of user 84 within the GUI 83. In particular, the virtual sound source 86 is positioned in front of the user, the virtual sound source 85 is positioned towards the left-front of the user, and the virtual sound source 87 is positioned behind and to the right of the user (e.g., in the X-Y plane). In one aspect, each of these virtual sound sources may be positioned at locations of respective electronic devices. In one aspect, each of the virtual sound sources represent locations within the X-Y plane to which sound of the sources are spatially rendered by the output device with respect to the user 14. As such, the GUI is displaying the configuration of virtual sound sources (as UI items), sounds of which are being spatially produced by the audio output device 10 (at or around the locations displayed within the GUI 83 with respect to the user 84).

The second stage 81 shows that the user has selected the UI item of virtual sound source 87, as shown by the UI item becoming highlighted. In particular, the audio playback device 18 determines that the virtual sound source 87 is of interest to the user, by determining that the user has selected (e.g., via user input) the source through the display 25. In particular, the user may touch the UI item by physically touching a location on the display 25 that is presenting the UI item of the sound source 87 (e.g., by selecting the sound source through touch input on the display 25), where touching the UI item displayed on the display indicates a selection of the (e.g., electronic device that is associated with the) sound source 87.

The third stage 82 shows the result of the user selecting the UI item of the virtual sound source 87. In particular, the virtual sound source 87 is being produced as direct sound (e.g., originating from in front of the user 14 or in a foreground), while the sound of the other virtual sound sources are being produced as ambient sound. To do this, the audio playback device 18 may be configured to produce ambient sound signals using audio signals of the sound sources 85 and 86 (e.g., applying reverberation). The playback device 18 may produce a mix that includes the audio signal of the source 87 and the produced ambient sound signals, and the playback device 18 may use the mix to (in lieu of the spatially rendered audio signals) to drive the speakers of the audio output device 10. In particular, when the operations are performed by the audio playback device 18, the mix may be transmitted in lieu of the spatially rendered audio signals to the audio output device 10 for playback.

In another aspect, the audio playback device 18 may perform one or more other audio signal processing operations in order to emphasize the sound of the virtual sound source 87 (e.g., over other virtual sound sources). For instance, the system may use the one or more audio signals of the virtual sound source to drive one or more driver speakers of the audio output device (e.g., when the virtual sound source is associated with an audio signal, using that signal to drive speaker driver 29*a* and using the same signal to drive speaker driver 29*b* of the device 10).

In some aspects, to emphasize the sound of the virtual sound source 87, the system may adjust sounds of one or more other sound sources (e.g., in lieu of or in addition to performing audio signal processing operations upon the virtual sound source 87). For instance, the playback device 18 may cease playing back sound of the virtual sound sources 85 and 86 (or may mute the sound sources). In another aspect, the playback device 18 may playback sound of the sources 85 and 86 in the background (as ambient sound).

As described thus far, the playback device 18 may receive one or more audio signals from an electronic device for spatial rendering to produce a virtual sound source. In one aspect, multiple audio output devices may be configured to receive the same audio signals, in order for different users to perceive the same virtual sound source at the location of the electronic device. Thus, sound of the electronic device may be "public," thereby allowing anyone (e.g., within range) to hear sounds of the device. In another aspect, however, sound of an electronic device may be "private," in that only one (or one or more specific audio output devices) may be configured to virtually produce sound of that device (e.g., when within range). In one aspect, sound of an electronic device may be private based on device settings (e.g., based on permissions provided to the device, which allow only specific audio output devices (and/or audio playback devices) to wirelessly receive audio data). In another aspect, permissions may be based on whether the electronic device is associated with a same user account as the audio playback device 18 (and/or audio output device 10).

In one aspect, an electronic device (e.g., the audio playback device 18) may be configured to wirelessly receive a first audio signal from a first electronic device, wirelessly receive a second audio signal from a second electronic device, were both the first and second audio signals are contemporaneously wirelessly received. The electronic device spatially renders the first and second audios signals to produce a set of binaural audio signals, and uses the binaural audio signals to drive several speakers (e.g., speakers of the audio output device 10) to produce a first virtual sound source for the first audio signal at a location of the first electronic device and a second virtual sound source for the second audio signal at a location of the second electronic device.

In one aspect, the controller 26 of the output device 10 may be configured to determine that a first virtual sound source that is spatially rendered by the output device is of interest to a user of the headset, produce an ambient sound signal using a second audio signal of a second virtual sound source, produce a mix that includes the first audio signal and the ambient sound signal, and use the mix in lieu of spatially rendered audio signals produced by spatially rendering the first and second audio signals to drive speaker drivers of the output device to produce the first audio signal as direct sound and to produce the ambient sound signal as ambient sound.

In another aspect, the controller 22 of the playback device may be configured to display, on display 25, a GUI that includes a UI item for controlling audio signal playback of the electronic device 21; and responsive to determining that the UI item has been selected by the user, transmitting one or more control signals to the electronic device to cause the electronic device to play back the audio signal; and ceasing transmission of the set of spatially rendered audio signals to the headset for playback. In another aspect, the controller 22 may identify an object within an environment in which the user is located, and assign a first virtual sound source at a location of the object within the environment, where the virtual sound source produces a second audio signal, and spatially render the first and second audio signals into the set of spatially rendered audio signals such that the headset produces the first virtual sound source at the location of the object and produces a second virtual sound source at the location of the electronic device when the set of spatially rendered audio signals are used to drive the one or more speakers of the headset. In some aspects, the audio playback device is a portable electronic device. In another aspect, the audio playback device is a wearable device that is arranged to be worn by the user.

While certain aspects have been described and shown in the accompanying drawings, it is to be understood that such aspects are merely illustrative of and not restrictive on the broad invention, and the invention is not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112 (f) unless the words "means for" or "step for" are explicitly used in the particular claim.

As described herein, one aspect of the present technology is the gathering and use of data available from specific and legitimate sources to manage multi-device connections with a headset using spatial audio. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to determine whether a headset is to establish a wireless link with an electronic device in order to receive audio data. Accordingly, use of such personal information data enables the system to spatially render the audio data through an audio output device at a virtual sound source at locations of the electronic devices.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide data such as image data captured by one or more cameras or microphone data captured by one or more microphones. In yet another example, users can select to limit the length of time data is maintained or entirely block the use of some data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

As previously explained, an aspect of the disclosure may be a non-transitory machine-readable medium (such as microelectronic memory) having stored thereon instructions, which program one or more data processing components (generically referred to here as a "processor") to perform the network operations and audio signal processing operations, as described herein. In other aspects, some of these operations might be performed by specific hardware components that contain hardwired logic. Those operations might alternatively be performed by any combination of programmed data processing components and fixed hardwired circuit components. In one aspect, the operations of the methods described herein may be performed by the audio output device when the one or more processors execute instructions stored within the non-transitory machine-readable medium. In another aspect, at least some of the operations of the methods described herein may be performed by the audio playback device.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method performed by a programmed processor of an audio playback device, the method comprising:

receiving, from a first electronic device and via a first wireless communication link, a first audio signal;

receiving, from a second electronic device and via a second wireless communication link, a second audio signal;

producing a set of spatially rendered audio signals by spatially rendering the first audio signal according to a first location of the first electronic device and the second audio signal according to a second location of the second electronic device;

transmitting, via a third wireless communication link with a headset, the set of spatially rendered audio signals to the headset that is being worn by a user of the audio playback device;

determining that sound of the first audio signal is of interest to the user;

producing an ambient sound signal by applying reverberation to the second audio signal; and transmitting, via the third wireless communication link, a mix that includes the first audio signal and the ambient sound signal in lieu of the set of spatially rendered audio signals to the headset.

2. The method of claim 1, wherein the first audio signal and the second audio signal are spatially rendered such that the headset produces a first virtual sound source at the first location that produces the first audio signal and a second virtual sound source at the second location that produces the second audio signal when the set of spatially rendered audio signals are used to drive one or more speakers of the headset.

3. The method of claim 1 further comprising displaying, on a display, a graphical user interface (GUI) that includes a first volume control for controlling a volume level of the first audio signal and includes a second volume control for controlling a volume level of the second audio signal, wherein, responsive to receiving user input to one of the first volume control and the second volume control, applying a gain to a respective one of the first audio signal and the second audio signal based on the user input.

4. The method of claim 1, wherein determining that the sound of the first audio signal is of interest to the user comprises receiving user input via the audio playback device that indicates a selection of the first electronic device.

5. The method of claim 1 further comprising:

displaying, on a display, a graphical user interface (GUI) a user interface (UI) item for spatially rendering sound of a third electronic device; and responsive to a user selection of the UI item, producing a new set of spatially rendered audio signals by spatially rendering the first audio signal according to the first location and a third audio signal that includes the sound according to a third location of the third electronic device; and transmitting, via the third wireless communication link, a new mix based on the new set of spatially rendered audio signals and the ambient sound signal.

6. The method of claim 1, wherein determining that the sound of the first audio signal is of interest to the user comprises determining that a gaze of the user is directed towards the first location of the first electronic device based on sensor data.

7. A method performed by a programmed processor of an electronic device, the method comprising:

wirelessly receiving a first audio signal from a first electronic device;

wirelessly receiving a second audio signal from a second electronic device, wherein both the first audio signal and the second audio signal are contemporaneously wirelessly received;

spatially rendering the first audio signal and the second audio signal to produce a set of binaural audio signals;

using the set of binaural audio signals to drive a plurality of speaker drivers to produce a first virtual sound source for the first audio signal at a first location of the first electronic device and a second virtual sound source for the second audio signal at a second location of the second electronic device;

determining that the second electronic device is to play back the second audio signal;

transmitting a control signal to cause the second electronic device to play back the second audio signal; and spatially rendering the first audio signal instead of the first audio signal and the second audio signal.

8. The method of claim 7, wherein the set of binaural audio signals is a first set of binaural audio signals, wherein the method further comprises:

receiving an indication that the first virtual sound source is to be muted;

producing a second set of binaural audio signals by spatially rendering the second audio signal according to the second location of the second electronic device; and using the second set of binaural audio signals instead of the first set of binaural audio signals to drive the plurality of speaker drivers to only produce the second virtual sound source.

9. The method of claim 7, wherein determining that the second electronic device is to play back the second audio signal comprises determining, using sensor data of a sensor of the electronic device, that the electronic device is moving or has moved away from the second electronic device beyond a threshold distance.

10. The method of claim 7, wherein the electronic device is a wireless headset.

11. The method of claim 7 further comprising, responsive to transmitting the control signal, disconnecting a wireless communication link with the second electronic device through which the second audio signal is wirelessly received.

12. The method of claim 7 further comprising, responsive to determining that the electronic device is moving away from the first electronic device, reducing a volume level of the first audio signal.

13. The method of claim 7 further comprising, responsive to determining that the electronic device has moved within a range for wireless communication with a third electronic device:

wirelessly receiving a third audio signal from the third electronic device;

spatially rendering the first audio signal and the third audio signal to produce a new set of binaural audio signals; and using the new set of binaural audio signals to drive the plurality of speaker drivers to produce the first virtual sound source and a third virtual sound source for the third audio signal.

14. An electronic device comprising:

a plurality of speaker drivers;

at least one processor; and memory having stored therein instructions which when executed by the at least one processor causes the electronic device to:

wirelessly receive a first audio signal from a first electronic device;

wirelessly receive a second audio signal from a second electronic device, wherein both the first audio signal and the second audio signal are contemporaneously wirelessly received;

spatially render the first audio signal and the second audio signal to produce a set of binaural audio signals;

use the set of binaural audio signals to drive the plurality of speaker drivers to produce a first virtual sound source for the first audio signal at a first location of the first electronic device and a second virtual sound source for the second audio signal at a second location of the second electronic device;

determine that the second electronic device is to play back the second audio signal;

transmit a control signal to cause the second electronic device to play back the second audio signal; and spatially render the first audio signal instead of the first audio signal and the second audio signal.

15. The electronic device of claim 14, wherein the set of binaural audio signals is a first set of binaural audio signals, wherein the memory comprises further instructions to:

receive an indication that the first virtual sound source is to be muted;

produce a second set of binaural audio signals by spatially rendering the second audio signal according to the second location of the second electronic device; and use the second set of binaural audio signals instead of the first set of binaural audio signals to drive the plurality of speaker drivers to only produce the second virtual sound source.

16. The electronic device of claim 14, wherein the instructions to determine that the second electronic device is to play back the second audio signal comprises instructions to determine, using sensor data of a sensor of the electronic device, that the electronic device is moving or has moved away from the second electronic device beyond a threshold distance.

17. The electronic device of claim 14, wherein the electronic device is a wireless headset.

18. The electronic device of claim 14, wherein the memory comprises further instructions to, responsive to a transmission of the control signal, disconnect a wireless communication link with the second electronic device through which the second audio signal is wirelessly received.

19. The electronic device of claim 14, wherein the memory comprises further instructions to, responsive to a determination that the electronic device is moving away from the first electronic device, reduce a volume level of the first audio signal.

20. The electronic device of claim 14, wherein the memory comprises further instructions to, responsive to a determination that the electronic device has moved within a range for wireless communication with a third electronic device:

wirelessly receive a third audio signal from the third electronic device;

spatially render the first audio signal and the third audio signal to produce a new set of binaural audio signals; and use the new set of binaural audio signals to drive the plurality of speaker drivers to produce the first virtual sound source and a third virtual sound source for the third audio signal.

* * * * *